(12) United States Patent
Barada et al.

(10) Patent No.: US 7,830,056 B2
(45) Date of Patent: Nov. 9, 2010

(54) MAGNETIC BEARING DEVICE AND METHOD

(75) Inventors: Toshimitsu Barada, Tokyo (JP); Toshiya Yoshida, Saitama (JP)

(73) Assignee: Ebara Corporation, Tokyo (JP)

( * ) Notice: Subject to any disclaimer, the term of this patent is extended or adjusted under 35 U.S.C. 154(b) by 139 days.

(21) Appl. No.: 11/994,931

(22) PCT Filed: Jul. 4, 2006

(86) PCT No.: PCT/JP2006/313340
§ 371 (c)(1),
(2), (4) Date: Oct. 16, 2008

(87) PCT Pub. No.: WO2007/004656
PCT Pub. Date: Jan. 11, 2007

(65) Prior Publication Data
US 2009/0096302 A1    Apr. 16, 2009

(30) Foreign Application Priority Data
Jul. 5, 2005 (JP) ............................. 2005-196635
Jul. 5, 2005 (JP) ............................. 2005-196636

(51) Int. Cl.
*H02K 7/09* (2006.01)
*F16C 39/00* (2006.01)
(52) U.S. Cl. .................. 310/90.5; 318/607; 318/632
(58) Field of Classification Search ............... 310/68 B, 310/90.5; 318/606–607, 620, 628, 632, 633, 318/635
See application file for complete search history.

(56) References Cited

U.S. PATENT DOCUMENTS
4,841,212 A * 6/1989 Matsushita et al. .......... 318/607
(Continued)

FOREIGN PATENT DOCUMENTS
JP         587140 A      4/1993
(Continued)

OTHER PUBLICATIONS
Kozo Morita et al. "Improvement of Position-sensing Characteristics in Self-Sensing Active Magnetic Bearings"; Tokyo Denki University, 11th European Conference of Power Electronics and Applications (EPE2005); Sep. 11 to 14, 2005; Dresden, Germany.
(Continued)

*Primary Examiner*—Tran N Nguyen
(74) *Attorney, Agent, or Firm*—Westerman, Hattori, Daniels & Adrian, LLP

(57) ABSTRACT

An energy-saving magnetic bearing device with no bias current for making the relation between the excitation current and the magnetic force of the electromagnet linear is provided. In a magnetic bearing device for supporting a rotor 1 serving as the magnetic piece in a levitating state allowing free rotation at a specified position by the magnetic force of a pair of electromagnets 2, 3, the electromagnets 2, 3 are constituted to interpose the rotor 1 and face each other. A driver 204 is a PWM (pulse width modulation) type driver for controlling the excitation current in the electromagnets 2, 3 by modulating the pulse width of a voltage driven at a specified carrier frequency fc, and includes a resonator means for electrically resonating at a frequency equal to the carrier frequency fc. When an excitation current flows in either one of the pair of opposing electromagnets 2, 3, then the other magnet is regulated so that the DC component in the electromagnet excitation current is zero, and a voltage is applied via the resonator means to the electromagnet whose DC component in the excitation current is discharged to zero.

29 Claims, 17 Drawing Sheets

U.S. PATENT DOCUMENTS

| | | | |
|---|---|---|---|
| 5,300,841 A * | 4/1994 | Preston et al. | 310/90.5 |
| 5,627,421 A * | 5/1997 | Miller et al. | 310/90.5 |
| 5,666,013 A | 9/1997 | Mizuno | |
| 6,657,345 B2 * | 12/2003 | Shinozaki | 310/90.5 |
| 6,984,907 B2 * | 1/2006 | Barada | 310/90.5 |
| 2002/0047405 A1 * | 4/2002 | Shinozaki | 310/90.5 |
| 2002/0096954 A1 * | 7/2002 | Shinozaki | 310/90.5 |

FOREIGN PATENT DOCUMENTS

| | | | |
|---|---|---|---|
| JP | 5118329 A | | 5/1993 |
| JP | 05118329 A | * | 5/1993 |
| JP | 6313426 A | | 11/1994 |
| JP | 11-082511 A | | 3/1999 |
| JP | 2001-165164 A | | 6/2001 |
| JP | 2004132537 A | | 4/2004 |

OTHER PUBLICATIONS

Yuki Kato et al. "A Self-Sensing Active Magnetic Bearing with Zero-Bias-Current Control"; Tokyo Denki University, 11th European Conference of Power Electronics and Applications (EPE2005); Sep. 11 to 14, 2005; Dresden, Germany.

International Search Report of PCT/JP2006/313340; date of mailing Oct. 31, 2006.

* cited by examiner

*FIG.5*

|     | ModeI - 1 | ModeI - 2 | ModeII - 1 | ModeII - 2 |
|-----|-----------|-----------|------------|------------|
| SW1 | ON        | OFF       | OFF        | OFF        |
| SW2 | OFF       | OFF       | ON         | OFF        |
| SW3 | OFF       | ON        | ON         | OFF        |
| SW4 | ON        | OFF       | OFF        | ON         |

FIG.6A  TIME T1(i₁ : PLUS, i₂ : MINUS)
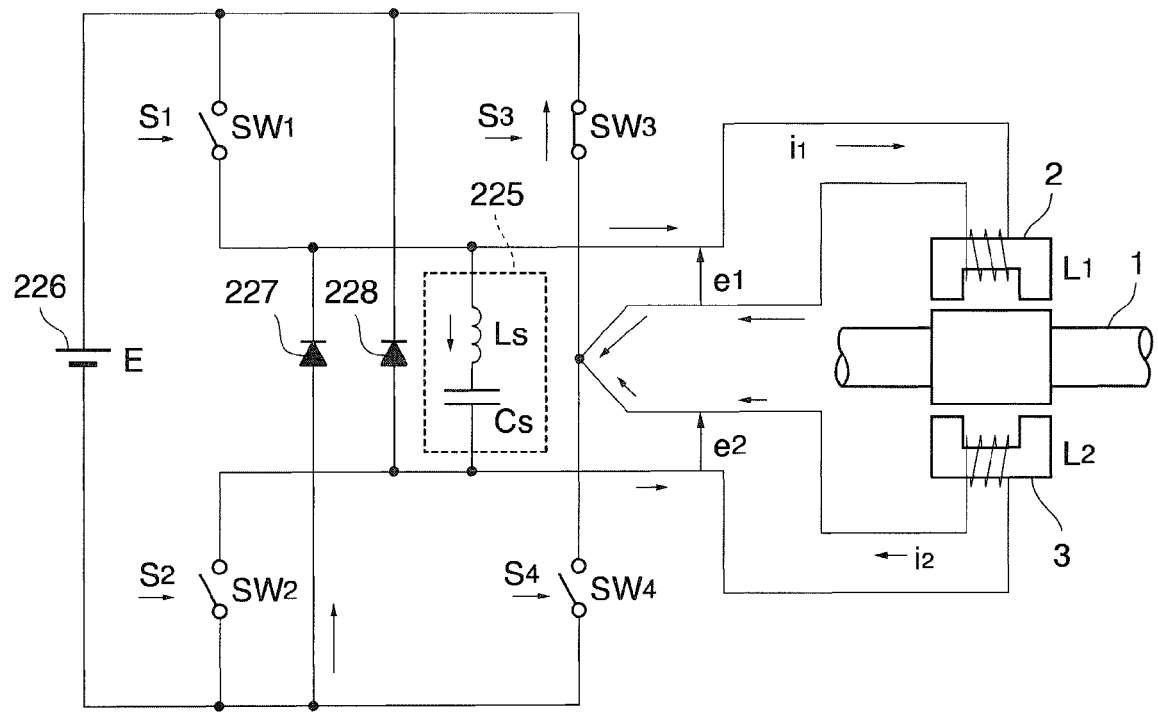
FIG.6B  TIME T2(i₁, i₂ : PLUS   i₁ > i₂)
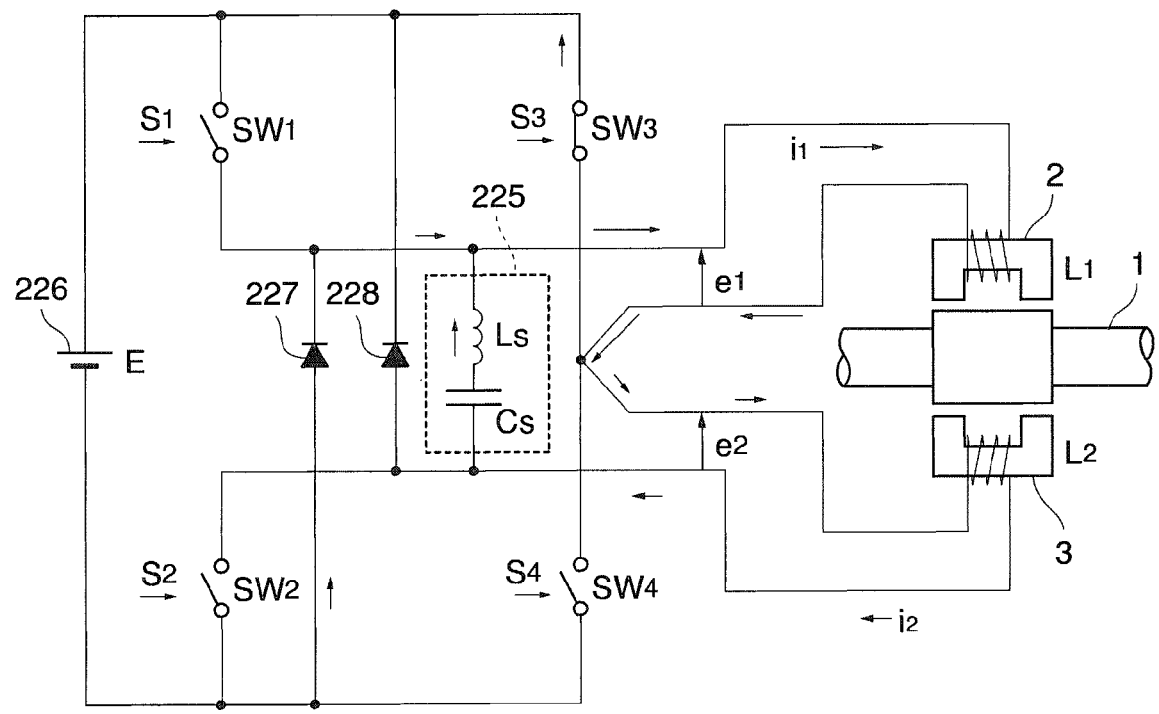

TIME T3($i_1$, $i_2$: PLUS $i_1 > i_2$)

TIME T4($i_1$: PLUS, $i_2$: MINUS)

*FIG.8A*   TIME T5(i1, i2 : PLUS i1 > i2)
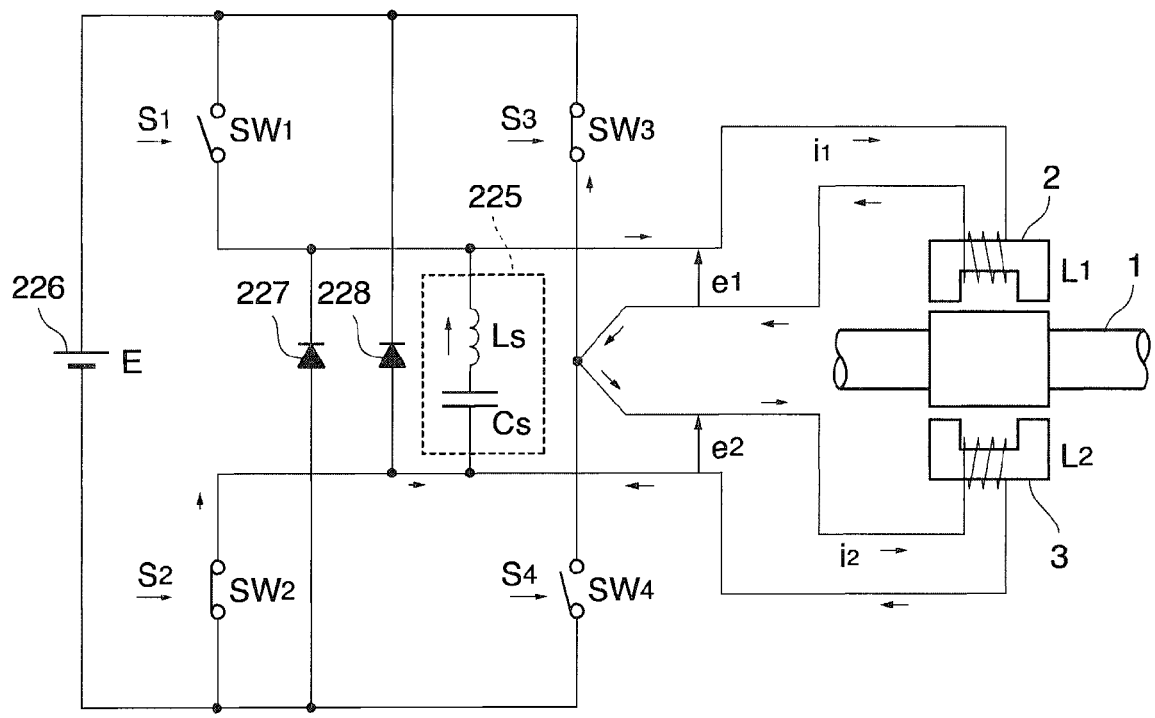
*FIG.8B*   TIME T6(i1 : MINUS, i2 : PLUS)
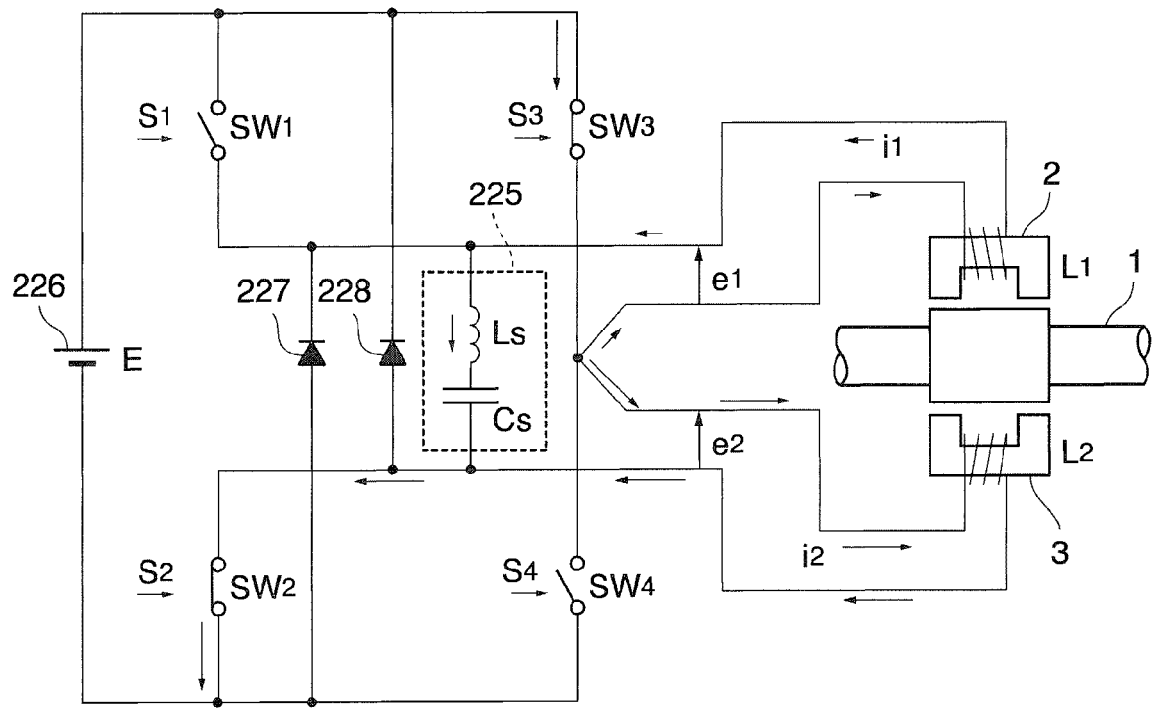

TIME T7($i_1$ : MINUS, $i_2$ : PLUS)

TIME T8($i_1$, $i_2$ : PLUS $i_1 < i_2$)

MAGNETIC BEARING DEVICE AND METHOD

TECHNICAL FIELD

The present invention relates to a magnetic bearing device and a magnetic bearing method for detecting the displacement of a magnetic piece by the change in impedance of the electromagnet for supporting the magnetic piece in a levitating state, and controlling the magnetic force of that electromagnet to support the magnetic piece in a specified position, and more particularly to a magnetic bearing device and a magnetic bearing method suitable for energy-saving.

The present invention further relates in particular to a magnetic bearing device and a magnetic bearing method including a displacement detection means for detecting with high accuracy the displacement of a magnetic piece by the change in impedance of the electromagnet.

BACKGROUND ART

Magnetic bearing devices utilizing magnetic force for non-contact support of a rotating piece are widely used in rotating equipment in the Background Art such as turbo molecular pumps that require a rotating piece be rotated at high-speed. Positive features of the magnetic bearing device are that it lowers the rotation resistance of the rotating piece supported by the bearing, generates no particles due to wear, and requires none of the maintenance usually needed due to bearing wear, and no contamination occurs from lubricant fluid in the bearing, etc.

Demands have increased in recent years for magnetic bearing devices that offer a lower cost, more space-saving and higher-speed rotation, etc. The technology of the Background Art has employed sensor-less magnetic bearings that did not require a displacement sensor. Instead of a displacement sensor, sensor-less magnetic bearings has utilized the change in impedance of the electromagnet as one method for detecting displacement of a rotating piece.

Most of the impedance of an electromagnet is made up of the inductance component. The change in this inductance is utilized to detect displacement of the rotating piece. The shape, number of windings, and material of the electromagnet core, as well as the gap between the rotating piece and electromagnet are the main factors in determining the inductance of the electromagnet. The material of the electromagnet core, shape, and the number of windings, are determined in the electromagnet design stage. The change in the inductance of the electromagnet occurs due to a change in the gap between the electromagnet and the rotating piece. In other words, the inductance of the electromagnet changes due to displacement of the rotating piece, and the displacement of that rotating piece can be detected by measuring this change. By feeding back this acquired displacement signal, the rotating piece can be supported in a non-contact levitating state at a specified position.

A non-linear relation is generally established between the magnetic force exerted on the rotating piece and the excitation current of the electromagnet. In the Background Art, a pair of electromagnets are therefore installed facing each other to sandwich the rotating piece, and by then applying a specified direct current bias to each of the opposing electromagnets, a linear relation can be established between the magnetic force exerted on the rotating piece and the excitation current of the electromagnet so that the rotating piece is stably supported in a levitating state as a simple linear system (see Patent Document 1 e.g.).

The method of the Background Art also had the following problems. When there is an actual change in the electromagnet current, then the magnetic characteristics of the electromagnet core change. The inductance of the electromagnet therefore changes even if there is no displacement of the rotating piece. Errors therefore occur when detecting displacement, due to this change in inductance caused by the current of the electromagnet. When applying an external force to the rotating piece via the electromagnets in general, the rotating piece displacement is large for the force at low frequencies, and the rotating piece displacement is small for the force at high frequencies. The change in inductance at low frequencies therefore causes a larger change in rotating piece displacement than from changes due to the electromagnet current, and there is little effect from displacement detection errors induced by the electromagnet current. However, the change in inductance at high frequencies renders the opposite effect in case that changes due to the electromagnet current are larger, and the effect to displacement detection errors is large. Therefore, control of the magnetic bearing tended to be unstable in the high frequency range.

As one countermeasure to this problem of unstable magnetic bearing control in the high frequency range, the Background Art as shown in the Patent Document 1 employed a method to detect the electromagnet current and eliminate the differential in predicted displacement detection error from the displacement detection signal that was detected via the change in impedance of the electromagnets (Patent document 1 e.g.).

[Patent Document 1] Laid Open Patent Application 2004-132537

DISCLOSURE OF INVENTION

Problems to be Solved

However, forming a linear relation between the excitation current in the electromagnet and the magnetic force exerted on the rotating piece by applying a DC bias to the electromagnet, constantly generates a copper loss in the electromagnet coil. This copper loss generates redundant heat in the magnetic bearing and therefore causes energy consumption to increase.

The sensor-less magnetic bearing of the Background Art detects displacement of the rotating piece by measuring the change in the electromagnet inductance. Here, in order to find the change in inductance, the magnetic bearing detects the amplitude of the ripple current generated by the PWM voltage applied to the electromagnet. A driver for generating the PWM voltage applies a PWM voltage to the electromagnet when in an ON state, and when in an OFF state returns the energy accumulated while the electromagnet is ON, to the PWM power supply via a flywheel diode. This driver utilizes a flywheel diode and so can only allow current flow to the electromagnet in one direction, and no ripple current is generated in the vicinity of the region where the electromagnet current is zero so detecting the rotating piece displacement is impossible. The magnetic bearing of the Background Art therefore constantly required a current flow larger than zero in the opposing electromagnet. This current flow did not usually pose a problem since a bias current was flowing to make a linear relationship between the magnetic force and the electrical current, in the magnetic bearing. However, the Background Art failed to provide a sensor-less magnetic bearing with zero bias magnetic bearing of a method of eliminating the flow of a bias current in the electromagnet to improve power consumption and to lower heat generation.

In view of the above points, the present invention has the first object of providing a sensor-less magnetic bearing device and a magnetic bearing method that do not require a bias current for making the relation between the excitation current and magnetic force of the electromagnet linear to save energy.

This method of the Background Art as shown Patent Document 1 above required a filter with characteristics equivalent to the displacement detection means frequency characteristics in order to predict the differential in the displacement detection error. However, the frequency characteristic of the displacement detection means is of a higher order, so that contriving a filter with characteristics equivalent to the displacement detection means characteristics was difficult. Consequently, eliminating with high precision the displacement detection error was difficult especially in the high frequency range.

The present invention therefore has the second object of eliminating the above mentioned problems by providing a magnetic bearing device and a magnetic bearing method capable of detecting displacement of the rotating piece in the high frequency range with high precision, and achieving stable magnetic bearing control up to the high frequency range.

Measures for Solving the Problems

The aspect (1) of the invention for solving the above mentioned problem is a magnetic bearing device for rotatably supporting a magnetic piece in a levitating state at a specified position comprising, an electromagnet for supporting the magnetic piece in a levitating state by magnetic force, displacement detection means for detecting a displacement of the magnetic piece based on impedance change in the electromagnet, compensation means for compensating so as to stably support the magnetic piece in a levitating state based on a detection signal from the displacement detection means, and a driver for applying an excitation current to the electromagnet based on an output signal from the compensation means, wherein the magnetic piece is interposed between a plurality of electromagnets installed opposite each other, the driver is a pulse width modulation type driver to control an excitation current of the electromagnet by modulating a pulse width of a pulse voltage driven at a specified carrier frequency, and includes an alternating current transfer means for setting a direct current component of the excitation current to zero, and when excitation current flows to one of the electromagnets installed facing each other, then the alternating current transfer means sets a direct current component of the excitation current of the other electromagnet to zero.

The aspect (2) of the invention is the above mentioned magnetic bearing device, wherein the alternating current transfer means is preferably resonator means with a serially connected coil and capacitor for electrically resonating at the same frequency as the carrier frequency.

The aspect (3) of the invention is the above mentioned magnetic bearing device which preferably detects respective excitation currents flowing in the electromagnets installed opposite each other sandwiching the magnetic piece and subtracts a deference of signals of the detected currents after the deference signal passing through filter means of the equivalent characteristics to transfer characteristics of the displacement detection means and an amplifier for amplifying with a specified gain, from the output signal of the displacement detecting means, wherein the specific frequency characteristics are equivalent to the transfer characteristics of the displacement detection means, and thus a signal contained in the detected signal other than the displacement information of the magnetic piece is removed.

The aspect (4) of the invention is the above mentioned magnetic bearing device, wherein preferably the compensation means removes a signal contained in a signal detected by the displacement detection means other than the displacement information of the magnetic piece, by subtracting a signal obtained after the signal passing through filter of the equivalent characteristics to the characteristics from getting current flow to the driver to current flowing in the electromagnets and an amplifier for amplifying with a specified gain, from a signal obtained from comparing a value of a ripple current occurring after applying the pulse voltage to an electromagnet in which excitation current is flowing, among the pair of electromagnets installed facing each other, with a value of a ripple current occurring after applying a voltage via the resonator means to the other magnet whose direct current component within the excitation current is set to zero.

The aspect (5) of the invention is the above mentioned magnetic bearing device preferably further comprising a linearization means for changing the non-linear relation between the magnetic force of the electromagnet exerted on the magnetic piece and the excitation current into a linear relation.

The aspect (6) of the invention is the above mentioned magnetic bearing device, wherein the compensation means, or the linearization means, or the compensation means and the linearization means preferably acquire an output by digital processing.

The aspect (7) of the invention for solving the above mentioned problem is a magnetic bearing device for rotatably supporting a magnetic piece in a levitating state at a specified position comprising, an electromagnet for supporting the magnetic piece in a levitating state by magnetic force, a displacement detection means for detecting a displacement of the magnetic piece based on impedance change in the electromagnet, a compensation means for compensating so as to stably support the magnetic piece in a levitating state based on a detection output signal from the displacement detection means, and a driver for applying an excitation current to the electromagnet based on an output signal from the compensation means, wherein the driver is a pulse width modulation type driver to control an excitation current of the electromagnet by modulating a pulse width of a pulse voltage driven at a specified carrier frequency, and the displacement detection means has a ripple detection means for detecting an amplitude of a ripple current generated by the driver applying a voltage to the electromagnet, and a signal contained in a signal detected by the displacement detection means other than the displacement information of the magnetic piece is removed by subtracting a signal obtained from an output signal of the compensation means passing through a filter means of characteristics equivalent to the transfer characteristics from getting current flow to the driver to current flowing in the electromagnets and through an amplifying means for amplifying with a specified gain, from a signal obtained from the ripple detection means.

The aspect (8) of the invention is the above mentioned magnetic bearing device, wherein preferably the filter means is a low-pass filter.

The aspect (9) of the invention is the above mentioned magnetic bearing device, wherein preferably the ripple detection means has a transformer having a ripple current amplitude detection winding for detecting an amplitude of the ripple current, and amplifies or attenuates the amplitude of the ripple with a specified rate by applying the electromagnetic inductive effect of the transformer, and outputs that amplitude as a voltage signal or a current signal.

The aspect (10) of the invention is the above mentioned magnetic bearing device, wherein a separate winding is installed in the transformer, a signal of equal frequency to the specified carrier frequency used in the driver is amplitude-modulated utilizing a signal obtained with the signal output from the compensation means passing through the filter means and the amplifier means, the amplitude-modulated signal is input to the separate winding, and the signal is subtracted by an electromagnetic induction effect from the signal detected by the ripple current amplitude detection winding.

Effect of the Invention

In the aspect (1) of the present invention, no bias current flows in the electromagnet so there is no need for a circuit to supply a bias current. Therefore, along with lowering costs there is also the advantage that the electromagnet coil wastes no redundant energy so an energy-saving magnetic bearing device can be provided. The magnetic force is applied to the magnetic piece from either one of the opposing magnets so the magnetic force applied to the magnetic piece can be easily estimated. The excitation current only flows in either one of the opposing magnets so energy can be saved. Moreover, a ripple current is generated by applying an alternating voltage oscillating at the same frequency as the carrier frequency of the PWM driver. The change in inductance of the electromagnet can be detected from this ripple current even if the electromagnet excitation current is near zero in a DC component, so that the displacement of the magnetic piece can be detected from this change in inductance.

In another aspect (2) of the present invention, the alternating current transfer means is composed of a coil and capacitor connected in series, and can therefore be easily constructed using a commercially available coil and capacitor.

In yet another aspect (3) of the present invention, the displacement detection error caused by the effect of a change in magnetic properties due to the change of the excitation current in the electromagnet, in other words a change of inductance of the magnet due to the excitation current, can be estimated from the electromagnet's excitation current. The displacement can therefore be detected with good accuracy by removing the error differential from the displacement detection signal.

In still another aspect (4) of the present invention, the displacement detection error caused by the effect of a change in magnetic properties due to the change of the excitation current in the electromagnet, in other words a change of inductance of the magnet due to the excitation current, can be estimated from a signal output from a compensation means. The displacement can therefore be detected with good accuracy by removing the error differential from the displacement detection signal.

In a further aspect (5) of the present invention, the magnetic bearing device includes a linearization means for making the relation between the magnetic force exerted on the magnetic piece and the excitation current of the electromagnet linear. An electrical current control signal can therefore be sent to the driver to make the magnetic force applied to the magnetic piece linear versus the displacement signal obtained from the displacement detection means so that a simple linear system can be established for the magnetic bearing device.

In a yet further aspect (6) of the present invention, the compensation means, or the linearization means, or the compensation means and linearization means are structured to acquire an output by digital processing. The characteristics of the compensation means and linearization means can therefore be easily programmed via a digital processing means such as DSP (Digital Signal Processor) to eliminate the bothersome task of building-and-assembling circuits and soldering work and to also allow those characteristics to easily change.

In a still further aspect (7) of the present invention, by subtracting the signal obtained after passing through a filter means containing characteristics equivalent to the transfer characteristics from the compensation means output signal commanding the driver to flow current in the electromagnet to the flow of current in the electromagnet and through an amplifier means for amplifying the signal by a specified gain, from the signal obtained from the ripple detection means, signals other than for the rotating piece displacement information contained in the signal detected by the displacement detection means can be removed. Therefore the transfer characteristics between the driver and the electromagnets are low order characteristics and a filter means with transfer characteristics equivalent to the same can easily be realized so that the displacement detection error due to the electromagnet current can be removed with good accuracy up through the high frequency range, and a magnetic bearing device capable of stable magnetic bearing control through the high frequency range can be provided.

In another aspect (8) of the present invention, the inductance characteristics of the electromagnet (frequency characteristics from the driver to electromagnet) basically make up the low-pass filter characteristics, so the filter means can be constituted as a low pass filter to remove the error of the displacement detected with the electromagnet current, up through the high frequency region.

In still another aspect (9) of the present invention, the ripple detection means includes a transformer, and by insulating the transformer, the amplitude signal of the ripple current as the displacement information contained in the electromagnet current can be applied to the low-voltage circuit as it is even for a high-voltage driver. Moreover a resonance circuit with a capacitor and winding can be constructed on the transformer output by connecting a capacitor or a capacitor and resistor in parallel across the winding terminals on the transformer output, so that a filter for removing any frequencies other than those containing the displacement information can be realized.

In yet another aspect (10) of the present invention, a separate winding is installed in the transformer, and a frequency signal identical to the specified carrier frequency used in the driver is amplitude-modulated utilizing a signal obtained with the signal output from the compensation means passing through the filter means and amplifier means, and the AM (amplitude-modulated) signal is input in this separate winding, and its signal is subtracted by an electromagnetic induction effect from the signal detected by the ripple current amplitude detecting winding, so that the predicted displacement detection error is in this way subtracted via the transformer from the displacement detection signal. This aspect of the present invention requires no subtraction means such as a new processing circuit, so that the cost can be reduced.

This application is based on the Patent Applications No. 2005-196635 filed on Jul. 5, 2005 and 2005-196636 filed on Jul. 5, 2005 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF DRAWINGS

FIG. 5 is a drawing showing the switching timing modes for switching element in the control section of the driver in the magnetic bearing device of the first embodiment of the present invention;

FIG. 6A is a drawing for describing the operation of the magnetic bearing device of the first embodiment of the present invention (at time T1);

FIG. 6B is a drawing for describing the operation of the magnetic bearing device of the first embodiment of the present invention (at time T2);

FIG. 8A is a drawing for describing the operation of the magnetic bearing device of the first embodiment of the present invention (at time T5);

FIG. 8B is a drawing for describing the operation of the magnetic bearing device of the first embodiment of the present invention (at time T6);

DESCRIPTION OF REFERENCE NUMERALS

Figure 1:
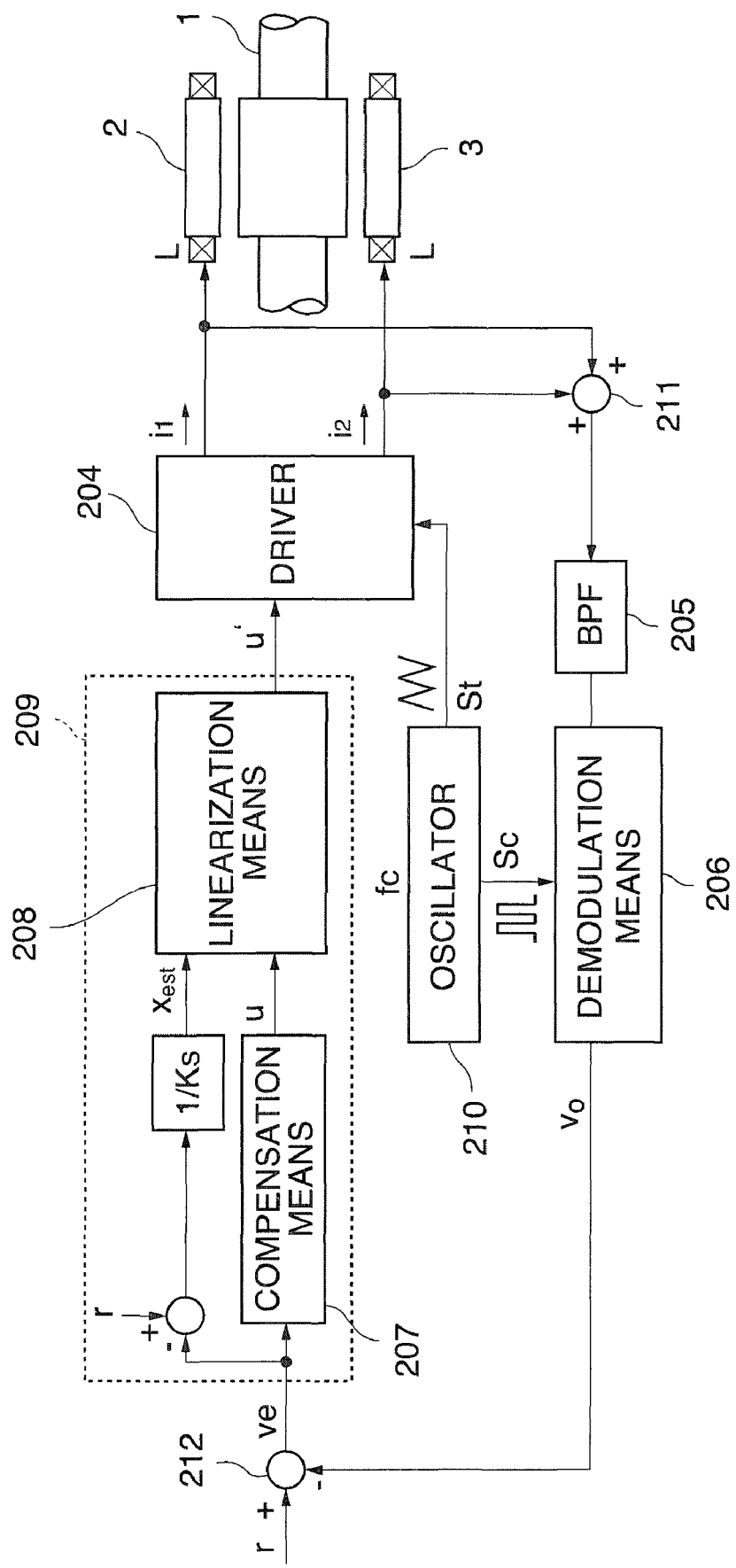
FIG. 1 is a block diagram showing the configuration of the magnetic bearing device of the first embodiment of the present invention.

Reference numerals for main elements used in the detailed description are listed below.
1 rotor
2 electromagnet
3 electromagnet
204 driver
205 bandpass filter (BPF)
206 demodulation means
207 compensation means
208 linearization means
209 digital processing means
210 oscillator
211 adder
212 comparator
225 resonator means
226 PWM power supply
227 flywheel diode
228 flywheel diode
229 inverter
230 AND circuit
231 AND circuit
232 amplifier
233 comparator
234 comparator
235 subtractor
236 comparator
237 comparator
241 amplifier
242 filter
243 subtractor
244 subtractor
245 subtractor
246 filter
247 amplifier
248 AM modulator
249 adder/subtractor
104 ripple detection means
105 bandpass filter (BPF)
106 demodulation means
107 compensation means
108 driver
109 filter means
110 amplifier
111 AM modulator
112 oscillator
113 transformer
114 capacitor 115 resistor
116 comparator
117 displacement detection means
121 low pass filter
122 low pass filter
123 PWM regulator
124 bias voltage power source
$SW_1$ switching device
$SW_2$ switching device
$SW_3$ switching device
$SW_4$ switching device

BEST MODE FOR CARRYING OUT THE INVENTION

Figure 2:
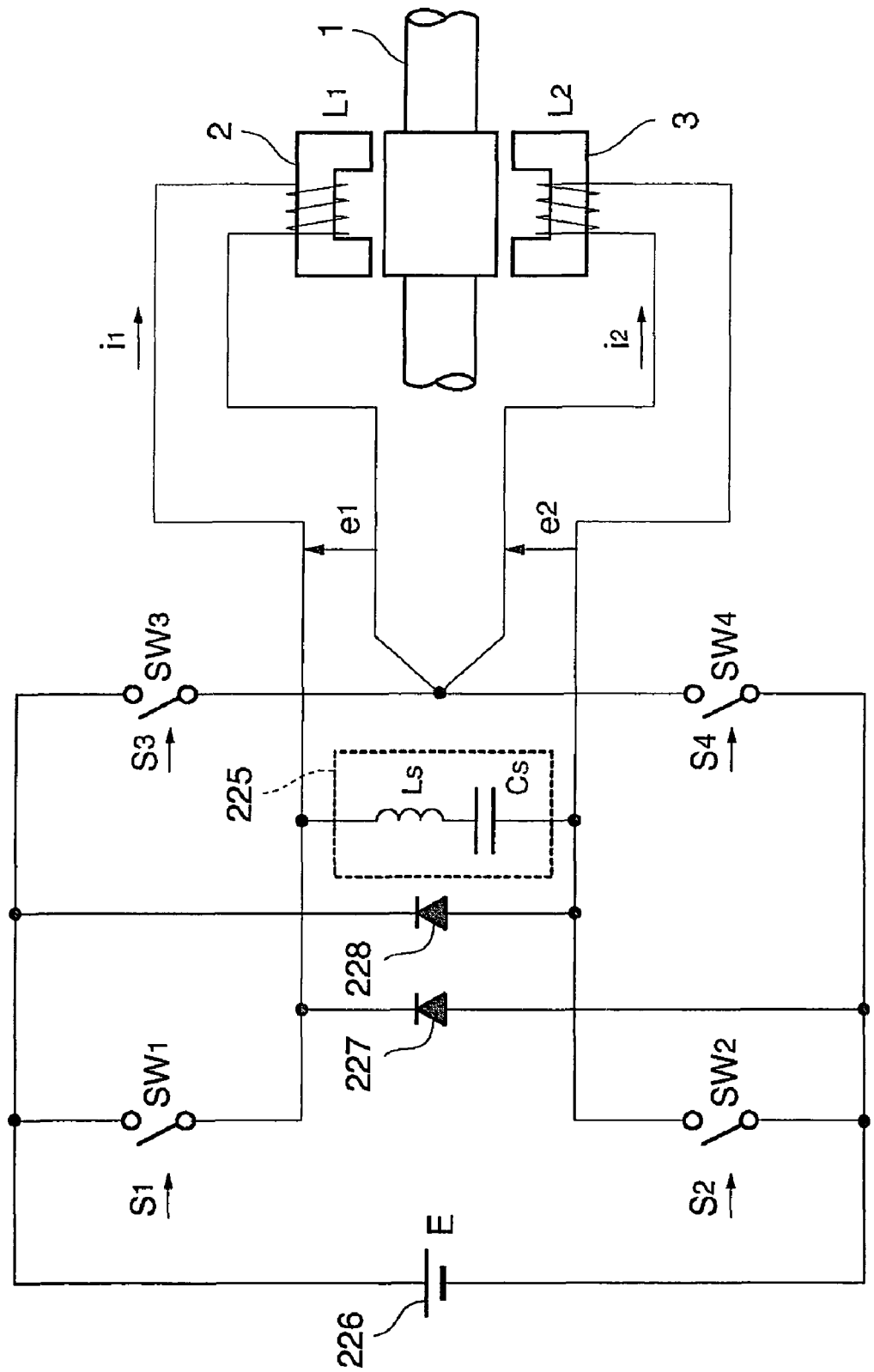
FIG. 2 is a drawing showing the configuration of the current supply section of the driver for the magnetic bearing device of the first embodiment of the present invention.
Figure 3:
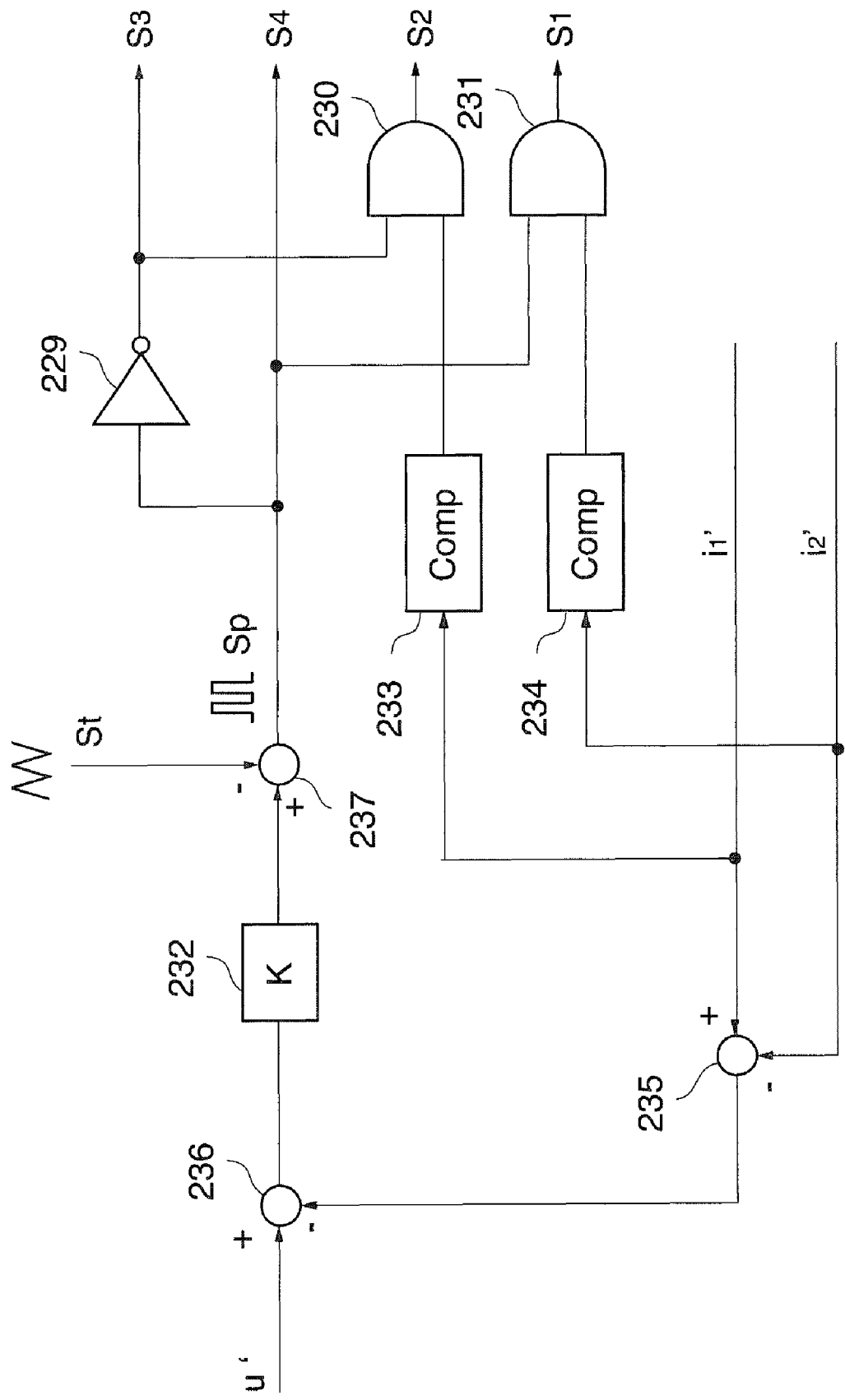
FIG. 3 is a drawing showing the configuration of the control section for the driver of the magnetic bearing device of the first embodiment of the present invention.
Figure 4:
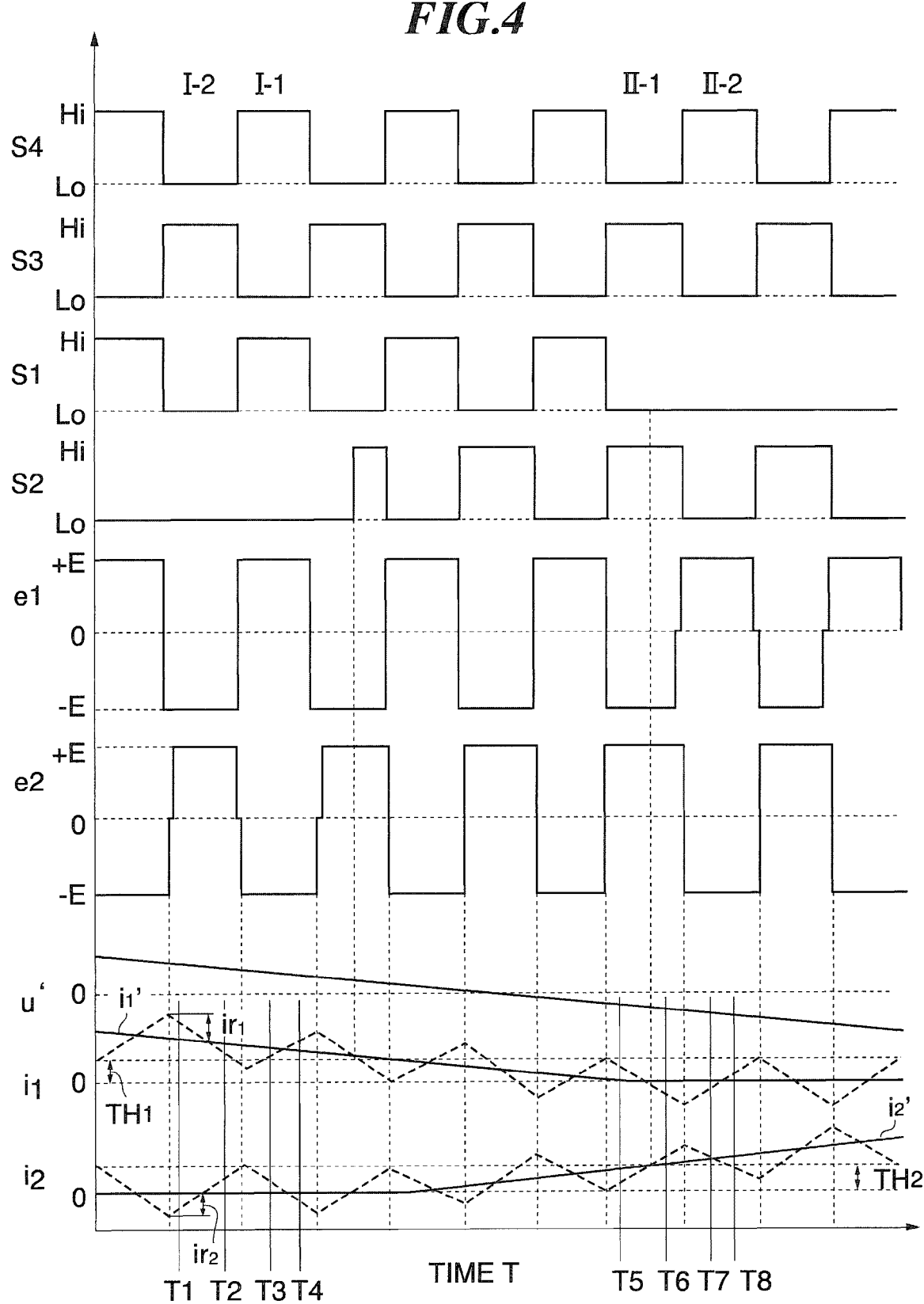
FIG. 4 is a drawing showing the signal of each section of the magnetic bearing device of the first embodiment of the present invention.

The first embodiment of the present invention is described next with reference to FIG. 1 through FIG. 4 and FIG. 13 through FIG. 16. FIG. 1 is a block diagram showing the configuration of the magnetic bearing device of the first embodiment of the present invention. FIG. 2 is a drawing showing the configuration of the current supply section of the driver. FIG. 3 is a drawing showing the configuration of the control section for the driver. FIG. 4 is a drawing showing the signal of each section of the magnetic bearing device. That is, FIG. 4 is a drawing showing the signal of each section of the magnetic bearing device when the control signal u' is input to the driver 204, and the duty ratio of the current to the magnet 2 and the excitation current tend to be larger toward the left hand side in the chart. They are opposite toward the right hand side.

As can be seen in the figures, the magnetic bearing device includes a rotor 1, an electromagnet 2, and electromagnet 3, a driver 204, a band-pass filter (BPF) 205, a demodulation means 206, a compensation means 207, a linearization means 208, a digital processing means 209, an oscillator 210, an adder 211, and a comparator 212. The rotor 1 or in other words the rotating piece constituted with a magnetic piece is interposed between a pair of electromagnets 2, 3 on opposite sides to support the rotor 1 in a non-contact, levitating state. These electromagnets 2, 3 support rotor 1 in some degrees of freedom. Usually multiple pairs of magnets are preferably utilized to support the rotor in a levitating state in 5 degrees of freedom in directions other than rotor axial rotation direction. However, for purposes of simplicity, only 1 degree of freedom is described here. The motor for rotating the rotor 1 is also omitted, and only the magnetic bearing is described. Here, the compensation means 207 is a well known feedback control system, which is a loop phase compensation system to keep the control stable.

As shown in FIG. 2, the driver 204 includes the switching devices $SW_1$, $SW_2$, $SW_3$, $SW_4$, a resonator means 225, a PWM (pulse width modulator) power supply 226, and the flywheel diodes 227, 228. FIG. 5 is a diagram showing the switching timing modes of the $SW_1$, $SW_2$, $SW_3$, $SW_4$ switching devices contained in the driver 204.

The driver 204 is a PWM type driver for supplying an excitation current to the electromagnets 2, 3. This driver 204 supplies excitation currents $i_1$, $i_2$ to the electromagnets 2, 3 by applying PWM voltages $e_1$, $e_2$ made up of the frequency fc generated by oscillator 210 as a carrier frequency. The resonator means 225 is constructed with a coil Ls and a capacitor Cs connected serially. The resonator means 225 is set to resonate at a frequency identical to carrier frequency fc. In other words, the impedance of the resonator means 225 is approximately zero at the frequency fc. The carrier frequency fc used in this magnetic bearing device is equal to 30 kHz, but frequencies from 10 kHz to 100 kHz may be utilized as the carrier frequency fc.

The driver 204 feeds a control current ic to the electromagnets 2, 3 by controlling the duty ratio of PWM voltages $e_1$, $e_2$ based on the control signal u', to generate the desired magnetic force. Applying the PWM voltages $e_1$, $e_2$ to electromagnets 2, 3 allows the ripple currents $ir_1$, $ir_2$ to flow while multiplexed with a control current ic. In other words, the current containing the control current ic and ripple currents $ir_1$, $ir_2$ flows in the electromagnets 2, 3, where the current ic directly contributes to the magnetic levitation and the currents $ir_1$, $ir_2$ do not directly contribute to the magnetic levitation but have displacement information about the rotor 1. As shown in FIG. 5, the switching devices $SW_1$, $SW_2$, $SW_3$, $SW_4$, turn on and off in four patterns of the Mode I-1, Mode I-2, Mode II-1 and Mode II-2. In other words, in Mode I-1, the switching device $SW_1$ is on, the $SW_2$ is off, the $SW_3$ is off, and the $SW_4$ is on. In Mode I-2, the switching device $SW_1$ is off, the $SW_2$ is off, the $SW_3$ is on, and the $SW_4$ is off. In Mode II-1, the switching device $SW_1$ is off, the $SW_2$ is on, the $SW_3$ is on, and the $SW_4$ is off. In Mode II-2, the switching device $SW_1$ is off, the $SW_2$ is off, the $SW_3$ is off, and the $SW_4$ is on.

FIG. 6 through FIG. 9 are drawings for describing the operation of the magnetic bearing device shown in the block diagram of FIG. 1, at the times $T_1$ through $T_8$ in FIG. 4. FIG. 6A shows the operation at time $T_1$ and FIG. 6B shows the operation at time $T_2$ at the switch timing in Mode I-2 respectively. FIG. 7A shows the operation at time $T_3$, and FIG. 7B shows the operation at time $T_4$ at the switch timing in Mode I-1 respectively. FIG. 8A shows the operation at time $T_5$, and FIG. 8B shows the operation at time $T_6$ at the switch timing in Mode II-1 respectively. FIG. 9A shows the operation at time $T_7$, and FIG. 9B shows the operation at time $T_8$ at the switch timing in Mode II-2 respectively.

As shown in FIG. 6A, in switch timing Mode I-2 at time $T_1$ (excitation current $i_1$: positive, excitation current $i_2$: negative), the switching device $SW_3$ is on, and the switching devices $SW_1$, $SW_2$, $SW_4$, are off, so that the excitation current $i_1$ flows to the electromagnet 2, and the excitation current $i_2$ flows via the resonator means 225 to the electromagnet 3. At time $T_2$ (excitation current $i_1$: positive, excitation current $i_2$: positive, $i_1 > i_2$), the excitation current $i_1$ flows to the electromagnet 2, and the excitation current $i_2$ flows via the resonator means 225 to the electromagnet 3.

Figure 7A:
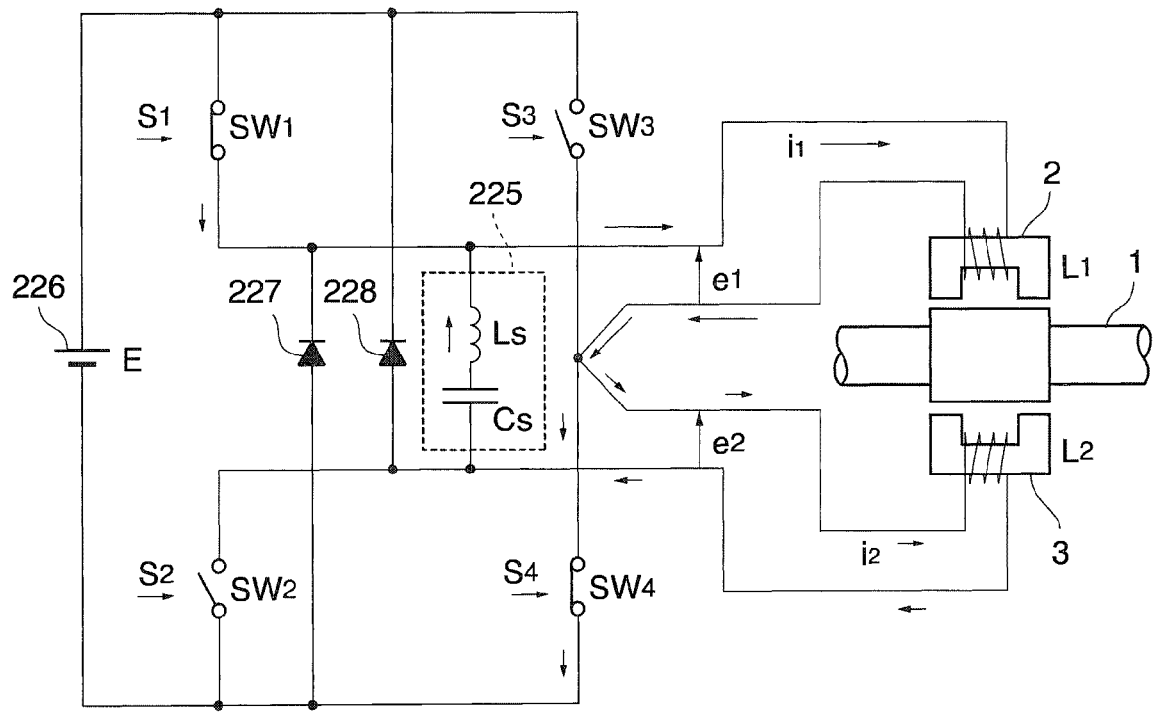
FIG. 7A is a drawing for describing the operation of the magnetic bearing device of the first embodiment of the present invention (at time T3)
Figure 7B:
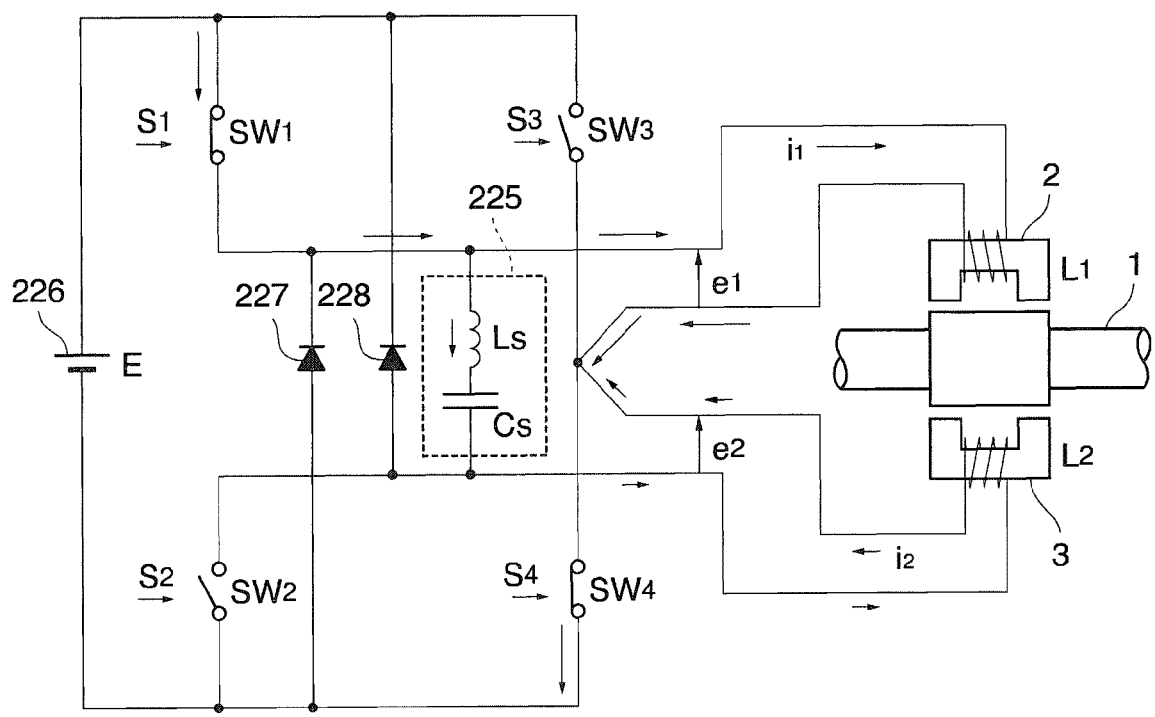
FIG. 7B is a drawing for describing the operation of the magnetic bearing device of the first embodiment of the present invention (at time T4)

As shown in FIG. 7A, in switch timing Mode I-1 at time $T_3$ (excitation current $i_1$: positive, excitation current $i_2$: positive, $i_1 > i_2$), the switching devices $SW_1$ and $SW_4$ are on and the switching devices $SW_2$ and $SW_3$ are off, so that an excitation current $i_1$ is applied to the electromagnet 2, and an excitation current $i_2$ flows via the resonator means 225 to the electromagnet 3. Also, as shown in FIG. 7B, at time $T_4$ (excitation current $i_1$: positive, excitation current $i_2$: negative) the excitation current $i_1$ flows to the electromagnet 2, and the excitation current $i_2$ flows via the resonator means 225 to the electromagnet 3.

As shown in FIG. 8A, in switch timing Mode II-1 at time $T_5$ ($i_1$: positive, $i_2$: positive, $i_1 > i_2$), the switching devices $SW_2$ and $SW_3$ are on, and the switching devices $SW_1$ and $SW_4$ are off, so that the excitation current $i_2$ flows to the electromagnet 3, and the excitation current $i_1$ flows via the resonator means 225 to the electromagnet 2. Also as shown in FIG. 8B, at time $T_6$ (excitation current $i_1$: negative, excitation current $i_2$: positive), the excitation current $i_2$ flows to the electromagnet 3 and the excitation current $i_1$ flows via the resonator means 225 to the electromagnet 2.

Figure 9A:
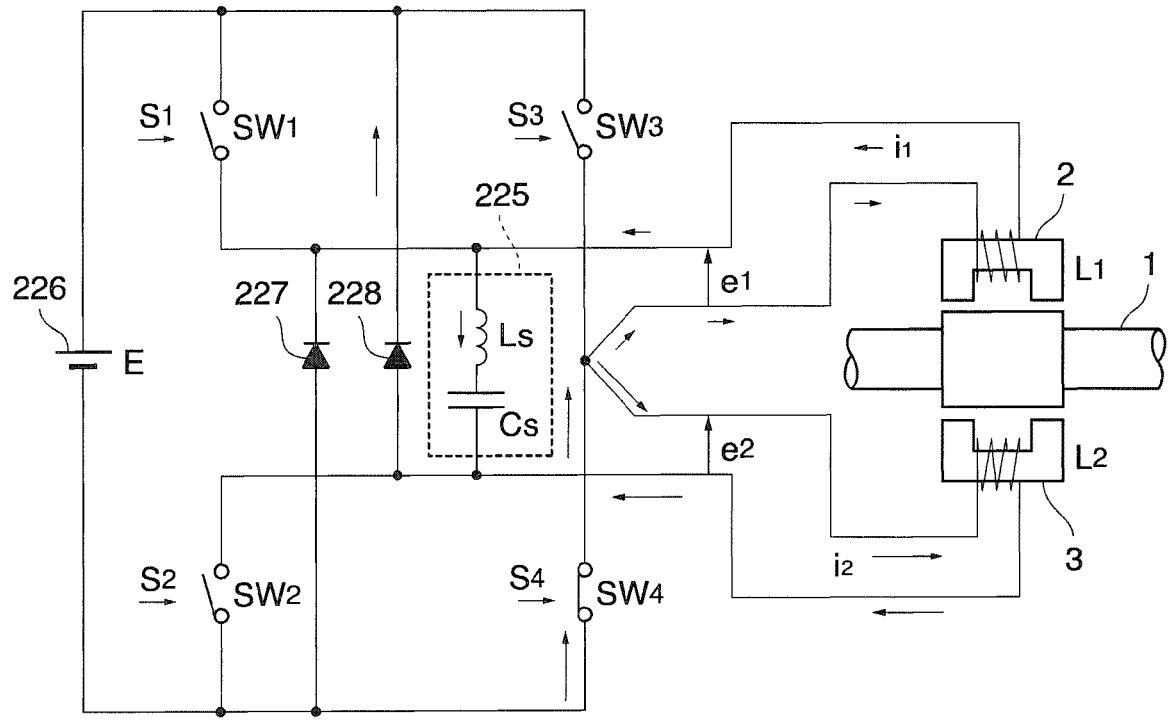
FIG. 9A is a drawing for describing the operation of the magnetic bearing device of the first embodiment of the present invention (at time T7)
Figure 9B:
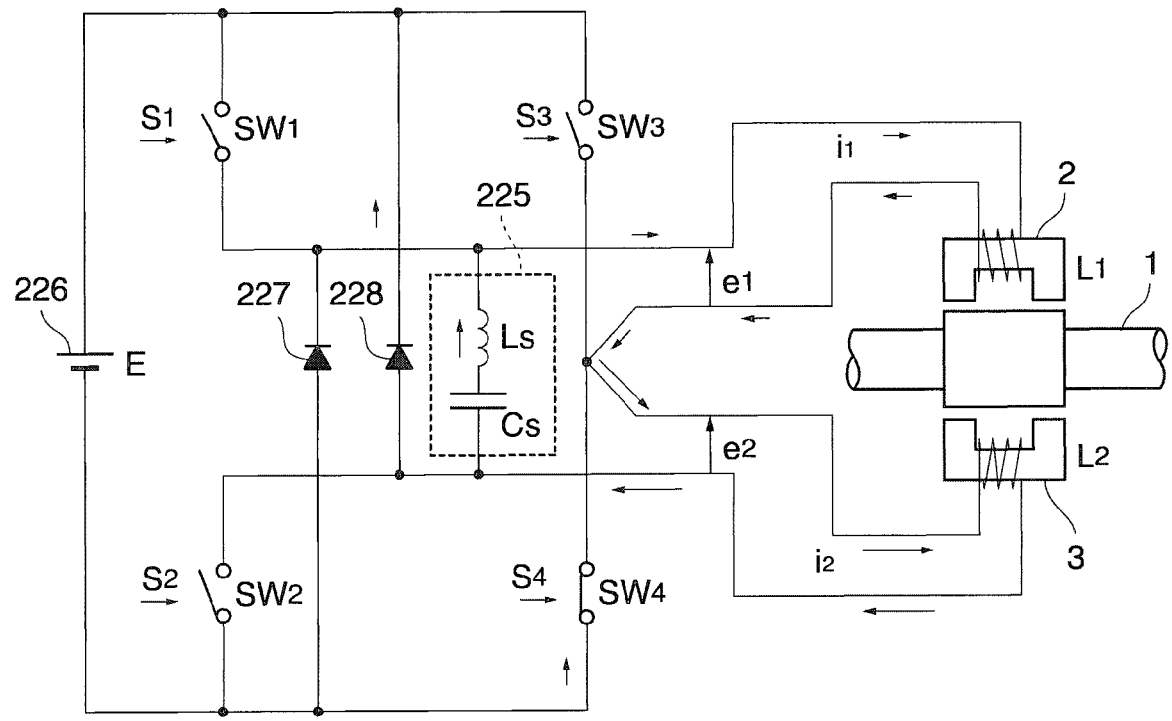
FIG. 9B is a drawing for describing the operation of the magnetic bearing device of the first embodiment of the present invention (at time T8)

As shown in FIG. 9A, in switch timing Mode II-2 at time $T_7$ (excitation current $i_1$: negative, excitation current $i_2$: positive), the switching device $SW_4$ is on, and the switching devices $SW_1$, $SW_2$, $SW_3$, are off so that the excitation current $i_2$ flows to the electromagnet 3, and the excitation current $i_1$ flows via the resonator means 225 to the electromagnet 2. Also as shown in FIG. 9B, at time $T_8$, (excitation current $i_1$: positive, excitation current $i_2$: positive, $i_1<i_2$), the excitation current $i_2$ flows to the electromagnet 3 and the excitation current $i_1$ flows via the resonator means 225 to the electromagnet 2.

In the switch timings in Mode I-1 and Mode I-2, a PWM voltage $e_1$ is applied to the electromagnet 2, and the desired control current ic is supplied by controlling the duty of PWM voltage $e_1$. A PWM voltage $e_2$ is applied via the resonator means 225 to the electromagnet 3 during this time, and the DC component removed from the current that is flowing. The PWM voltage $e_1$ and $e_2$ are applied as mutually reverse voltages at this time, and the ripple currents $ir_1$ and $ir_2$ oscillate in mutually reverse directions as shown in FIG. 4. Therefore, at the switch timings of Mode I-1 and Mode I-2, the excitation currents $i_1$ and $i_2$ are as shown by the following formula (1).

$$i_1 = ic + ir_1$$
$$i_2 = -ir_2 \quad (1)$$

In the switch timing in Mode II-1 and Mode II-2 on the other hand, the control current ic flows to the electromagnet 3, opposite to the case in Mode I-1 and Mode I-2. Therefore at the switch timings Mode II-1 and Mode II-2, the excitation currents $i_1$ and $i_2$ are as shown by the following formula (2).

$$i_1 = ir_1$$
$$i_2 = ic - ir_2 \quad (2)$$

As shown in FIG. 4, if the control current ic is flowing in either one of the electromagnets 2, 3, then the driver 204 can set the other electromagnet to only allow ripple current flow whose time averaged current is zero. The switch signals $S_1$, $S_2$, $S_3$, $S_4$ switch the respective switching devices $SW_1$, $SW_2$, $SW_3$, $SW_4$, on/off. The switching devices $SW_1$, $SW_2$, $SW_3$, $SW_4$ turn on when the switch signals $S_1$, $S_2$, $S_3$, $S_4$ are Hi (high level), and turn off when they are Lo (low level).

Expressing the excitation current $i_1$ and $i_2$ of formulas (1) and (2), respectively as $i_1'$ and $i_2'$ with their high-frequency component removed by a low-pass filter yields the formulas (1') and (2'). The $i_1'$ and $i_2'$ become only the control current information ic or zero because the ripple currents $ir_1$ and $ir_2$ components of currents $i_1$ and $i_2$ are removed.

$$i_1' = ic$$
$$i_2' = 0 \quad (1')$$

$$i_1' = 0$$
$$i_2' = ic \quad (2')$$

As shown in FIG. 3, the driver 204 detects the $i_1'$ and $i_2'$, the currents $i_1'$ and $i_2'$ are mutually subtracted in the subtractor 235, the output signal from the subtractor 235 is fed back and compared with the control signal u' in the comparator 236 and the compared signal is amplified by the amplifier 232 with gain of K. At the comparator 237, the signal output from the amplifier 232 is compared with a triangular waveform signal St of a frequency equal to the PWM carrier frequency fc output from the oscillator 210, whereby the PWM signal Sp of the desired duty ratio is obtained. The switch signal $S_4$ and the switch signal $S_3$ inverted by the inverter 229 are output via the PWM signal Sp so that the on and off timing of switching devices $SW_3$ and $SW_4$ always operate opposite each other. Thus, the control signal $i_c$ is obtained which is corresponding to the control signal u'.

The comparator 233 contains a tiny comparison reference value $TH_1$ (See FIG. 4) set at a value equal to or larger than the amplitude of the ripple current $ir_1$. The comparator 233 outputs a Lo (low) when the control current $i_1'$ of electromagnet 2 is larger than the comparator reference value $TH_1$, and outputs a Hi (high) when equal to or smaller than the comparison reference value $TH_1$. The comparator 234 contains a tiny comparison reference value $TH_2$ (See FIG. 4) set at a value equal to or larger than the ripple current $ir_2$ the same as for comparator 233. The comparator 234 outputs a Lo (low) when the control current $i_2'$ of electromagnet 3 is larger than the comparator reference value $TH_2$, and outputs a Hi (high) when equal to or smaller than the comparison reference value $TH_2$. These comparison reference values $TH_1$ and $TH_2$ are set so that a current definitely flows in either the $i_1'$ or $i_2'$. These comparison reference values $TH_1$ and $TH_2$ may be set to the same value. The switch signal $S_2$ may be combined with an AND processor 230 (See FIG. 3) to support a Lo output when the control current $i_1'$ of electromagnet 2 is larger than $TH_1$, as shown in FIG. 4. When the control current $i_1'$ is equal to or smaller than $TH_1$, the switch signal $S_2$ may be synchronized with the switching device $SW_3$ to turn the switching device $SW_2$ on/off.

The switch signal $S_1$ may be combined with an AND processor 231 (See FIG. 3) to support a Lo output when the control current $i_2'$ of electromagnet 3 is larger than $TH_2$. When the control current $i_2'$ is equal to or smaller than $TH_2$, the switch signal $S_1$ may be synchronized with the switching device $SW_4$ to turn the switching device $SW_1$ on/off. In the period here where the switching device $SW_1$ is off, current is always supplied via the resonator means 225 to the electromagnet 2, the direct current component is removed, only the ripple $ir_1$ current flows, so that the time-averaged current becomes zero. Conversely in the period where the switching device $SW_2$ is off, the time-averaged current of the electromagnet 3 becomes zero, and only the ripple current $ir_2$ flows.

As shown in FIG. 4, the driver 204 in this way controls operation, so that if the control current ic flows in either one of the electromagnets 2, 3, then the time-averaged current flowing in the other electromagnet becomes zero. Moreover, by feeding back the differential between the $i_1'$ and $i_2'$ values, the control current can excite the electromagnet 2 and electromagnet 3 based on the control signal u'. The control current ic can here flow to the electromagnet 2 if the control signal u' is positive. The control current ic can here flow to the electromagnet 3 if the control signal u' is negative.

When the PWM voltages $e_1$, $e_2$ applied to the electromagnets 2, 3, a current then flows according to the respective impedance, and the PWM voltages $e_1$, $e_2$ are at a high frequency so that the impedance components of the electromagnets 2, 3 may be considered the inductance component. Summing the excitation current $i_1$ and the excitation current $i_2$ per formulas (1) and (2) yields the following formula (3).

$$i_1 + i_2 = ic + (ir_1 - ir_2) \quad (3)$$

The $ir_1 - ir_2$ in formula (3) is a ripple current component varying by the inductances $L_1$, $L_2$ of the electromagnets 2, 3 and containing displacement information on the rotor 1. Here, $ir_1 - ir_2$ is generally expressed in formula (4).

$$ir_1 - ir_2 = k\{(1/L_1) - (1/L_2)\} \quad (4)$$

The k in formula (4) denotes a constant determined by the carrier frequency fc and the PWM drive voltage E.

Here, when the rotor 1 is in the center between the electromagnet 2 and the electromagnet 3, then the gap between the electromagnets 2, 3 and the rotor 1 is set as $X_0$, and the inductance as $L_0$. The formula (5) can then be established when the rotor 1 was displaced by a tiny amount x toward the electromagnet 3.

$$(1/L_1)-(1/L_2)=2x/(L_0 \cdot X_0) \quad (5)$$

From formulas (4) and (5), the ripple current component $ir_1-ir_2$ turns out to contain linear displacement information.

As shown in FIG. 1, the magnetic bearing device of the first embodiment, detects the excitation current $i_1$ and excitation current $i_2$ and by allowing the sum of their respective signals to pass through a band-pass filter 205 whose center frequency is the carrier frequency fc, removes the control current ic of formula (3), and extracts the ripple current component or in other words, the displacement information component $ir_1-ir_2$. This displacement information component is obtained as an AM modulation signal equal to the carrier frequency fc, versus the displacement of the rotor 1, and is demodulated by the demodulation means 206, to obtain the displacement signal $v_0$. The demodulation means 206 demodulates the displacement information component of the AM modulation signal according to the pulse signal Sc of a frequency equal to the PWM carrier frequency fc obtained from the oscillator 210.

The displacement signal $v_0$ obtained by the demodulation means 206 is fed back and the comparator 212 compares it with the levitating target position signal r, and inputs a differential signal ve to the digital processor means 209, to obtain the desired control signal u' for supporting the rotor 1 in a stable, non-contact levitating state. This control signal u' is then input to the driver 204 to start the excitation $i_1$, $i_2$ current flow and excite the electromagnets, to obtain the magnetic force required for supporting the rotor 1 in a non-contact levitating state. The displacement signal $v_0$ is adjusted so that $v_0=Ks \cdot x$ for a displacement x. Here, Ks denotes the specified constant.

Now, when the rotor 1 is in the center between the electromagnet 2 and the electromagnet 3, the gap between the electromagnets 2, 3 and the rotor 1 is set as $X_0$ and the inductance is set as $L_0$; and when the rotor 1 is displaced by a tiny amount x towards the electromagnet 3, then the magnetic force $f_1$ and the magnetic force $f_2$ that the electromagnets 2, 3 respectively exert on the rotor 1 can generally be expressed as the formula (6).

$$f_1=k_0\{i_1/(X_0+x)\}^2$$

$$f_2=k_0\{i_2/(X_0-x)\}^2 \quad (6)$$

The magnetic force $f_1$ and $f_2$ as shown in formula (6) are non-linear versus the excitation currents $i_1$, $i_2$ and displacement x. As well known, a non-linear control system complicatedly behaves and a linear control system, a simpler system, is preferable. Here, the $k_0$ in formula (6) denotes a constant determined by the shape of the electromagnet core and the number of coil windings.

Therefore, as shown in FIG. 1, in the first embodiment the deviation signal ve is subtracted from the levitating target position signal r in the digital processor means 209, and the compensation signal u along with estimated displacement signal $x_{est}$ obtained resulting from multiplying the subtracted signal by 1/ks is input to the linearization means 208, and linearization is then performed. The linearization means 208 processes according to formula (7), and outputs the control signal u'.

$$u'=\text{sign}(u) \cdot Km(X_0+|x_{est}|) \cdot (u)^{1/2} \quad (7)$$

Here, Km denotes the specified constant, and the sign (u) denote the sign of the compensation signal u. The relationship between the displacement x and the control signal u' is linearized through the above processing. The output from the processing in the digital processing means 209 is obtained via digital processing in DSP.

The inductances $L_1$, $L_2$ of the electromagnets 2, 3 generally change not only with the rotor 1 displacement but also with the control current ic flowing in the electro magnets. The displacement signal $v_0$ obtained from the demodulation means 206 therefore frequently contains a displacement error. To eliminate this displacement error, a method can be used that detects the excitation currents $i_1$, $i_2$, predicts the displacement error based on the control current component signal obtained by removing the ripple current components by allowing the mutually subtracted signals to pass through a low-pass filter etc., and removes the predicted error from the displacement signal $v_0$.

Figure 13:
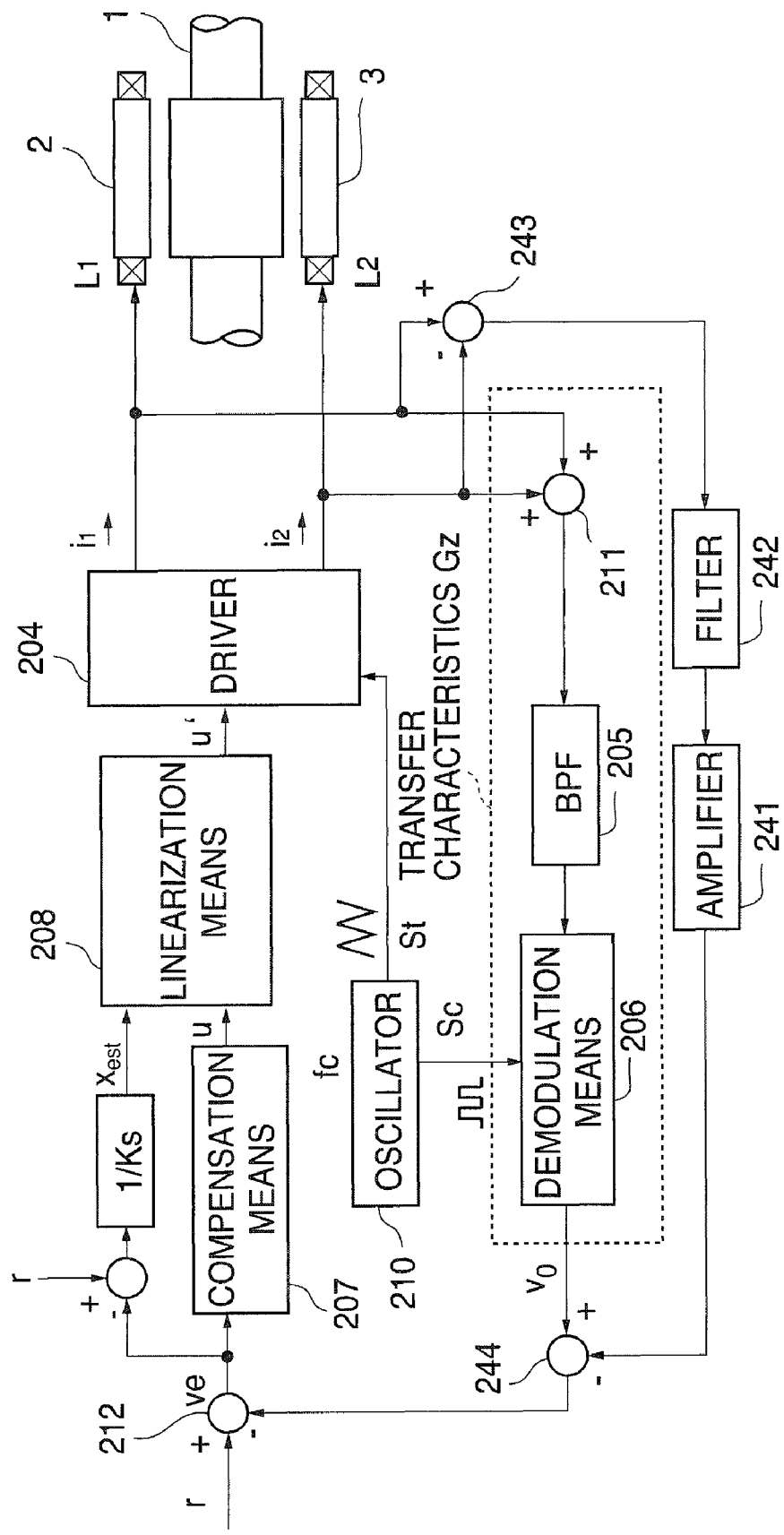
FIG. 13 is a block diagram showing the first example of configuration where the detection error due to the control current is removed.
Figure 14:
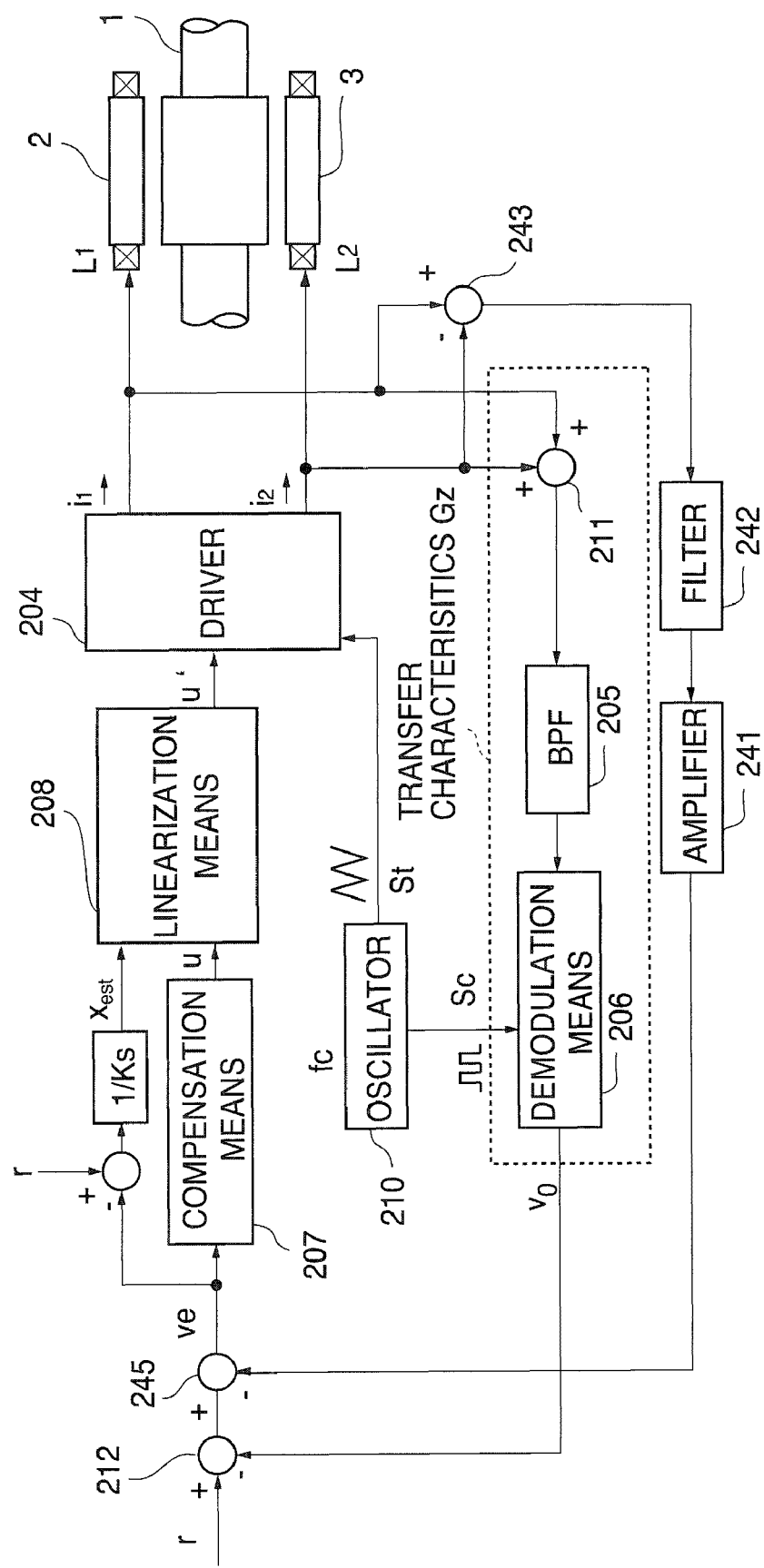
FIG. 14 is a block diagram showing the second example of configuration where the detection error due to the control current is removed.

In FIG. 13 and FIG. 14, an embodiment with a specific configuration is shown. In FIG. 13, a difference between the current $i_1$ and $i_2$ is detected by the subtractor 243 and the ripple current is removed by a low pass filter (not shown) to detect the control current $i_c$. This signal is allowed to pass the cascade circuit of the filter 242 the amplifier 241. Here, the transfer characteristics of the filter 242 is set so that it agrees to the overall transfer characteristics Gz obtained by putting the adder 211, BPF 205 and demodulation means 206 together. The amplifier 241 is set at a specific gain determined based on the PWM power source voltage, PWM carrier frequency and a varying degree of the inductances $L_1$, $L_2$ caused by the excitation current etc. Thus, the predicted displacement error signal is output from the amplifier 241. The output signal is subtracted from the output signal of the demodulation means 206 and the displacement error signal is removed. Here, the amplifier 241 does not have to be prepared separately from the filter 242 but an amplifier and a filter may be integrated into a filter-amplifier. Further, if a necessary level displacement error signal can be obtained only with a filter, an amplifier is not required.

In FIG. 14, the subtracting process is carried out after the comparator 212, and the same effect is obtained as in FIG. 13.

Figure 15:
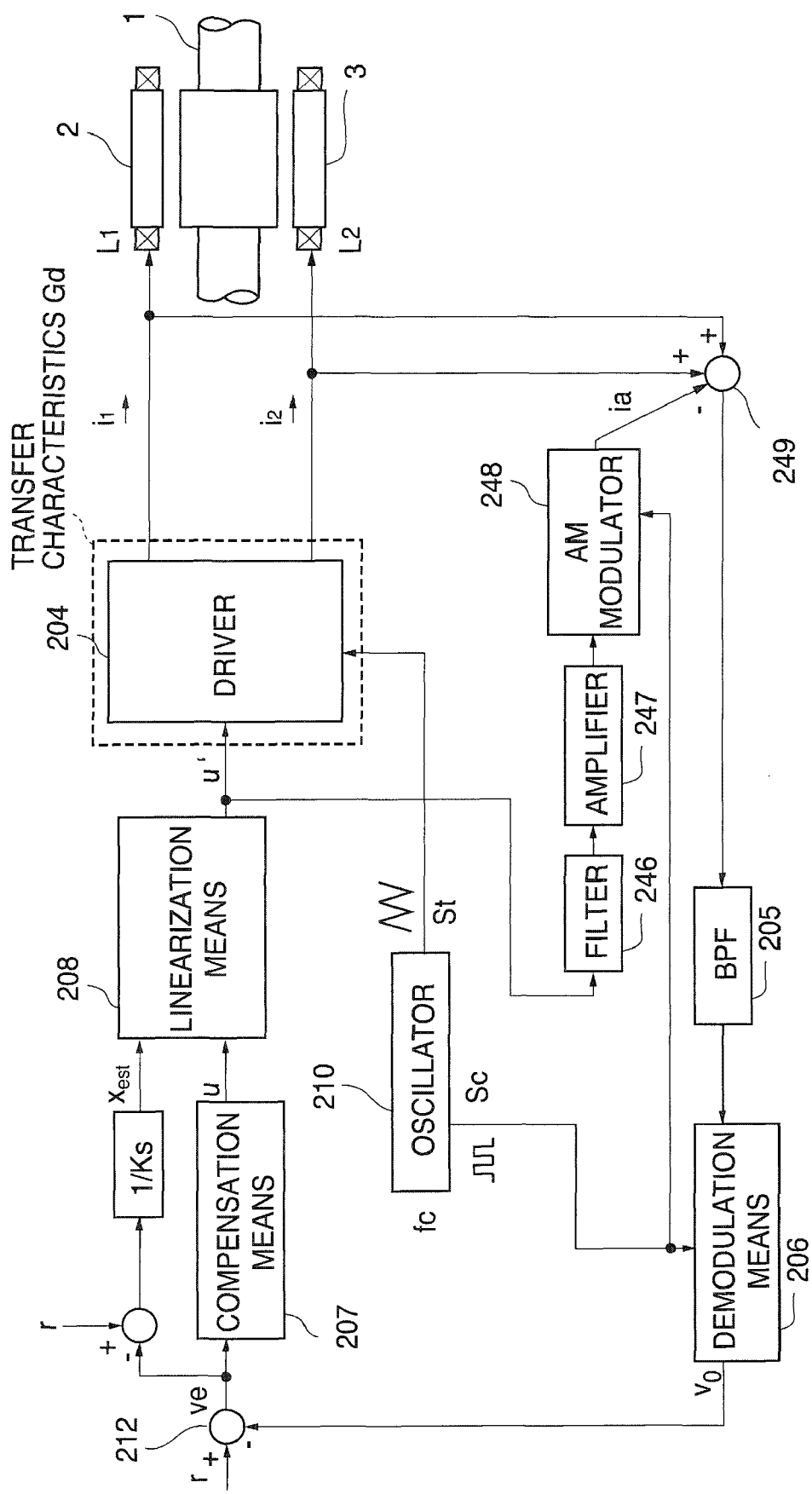
FIG. 15 is a block diagram showing the third example of configuration where the detection error due to the control current is removed.
Figure 16:
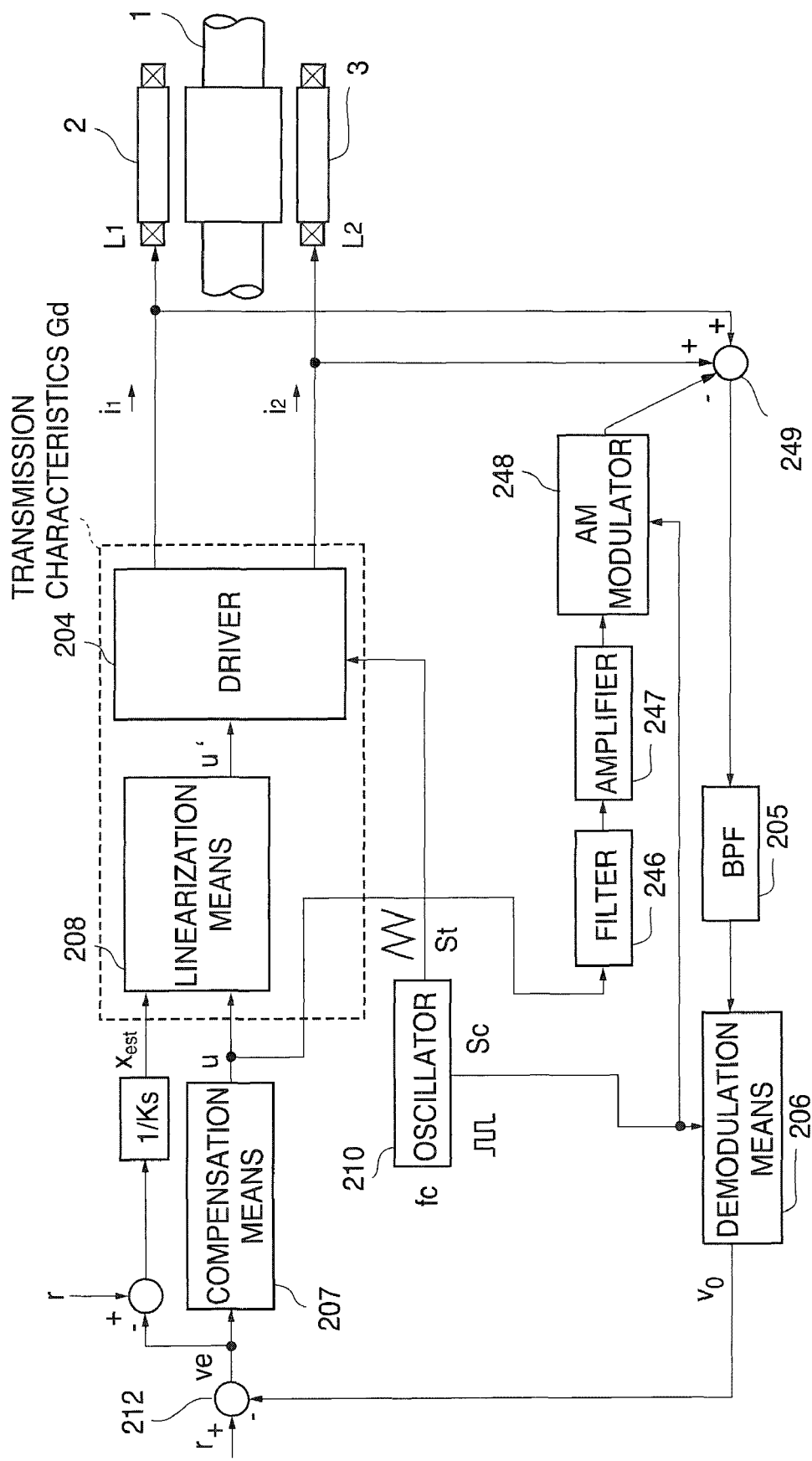
FIG. 16 is a block diagram showing the fourth example of configuration where the detection error due to the control current is removed.

Another method is to employ an AM modulation to modulate a carrier frequency signal with the displacement error component of the signal predicted from the control signal u', and then detect the excitation currents $i_1$, $i_2$, and add the currents $i_1$ and $i_2$ to obtain the summed AM modulated signal from which the AM modulated signal of the displacement error component may be subtracted. In FIG. 15 and FIG. 16, an embodiment with a specific configuration is shown. In FIG. 15, a filter 246 with the characteristics equivalent to the transfer characteristics Gd of the driver 204, an amplifier 247 to amplify with a specific gain determined based on the PWM power source voltage, PWM carrier frequency and a varying degree of the inductances $L_1$, $L_2$ caused by the excitation current etc., an AM modulator 248 to AM modulate carrier frequency fc signal are arranged between the input terminal of the driver 204 and the adder-subtractor 249 to remove the displacement error signal.

In FIG. 16, a filter 246 with the characteristics equivalent to the transfer characteristics Gd obtained by integrating the transfer characteristics of the driver 204 and those of the linearization means 208, an amplifier 247 to amplify with a specific gain determined based on the PWM power source voltage, PWM carrier frequency and a varying degree of the inductances $L_1$, $L_2$ caused by the excitation current etc., an AM modulator 248 to AM modulate carrier frequency fc signal are arranged between the output terminal of the compensation means 207 and the adder-subtractor 249 to remove the displacement error signal.

Here, the same as FIGS. 13 and 14, the amplifier 247 does not have to be prepared separately from the filter 246 but an amplifier and a filter may be integrated into a filter-amplifier. Further, there is possibly an embodiment where an amplifier is not required.

In the first embodiment of the magnetic bearing device, the unnecessary energy losses due to copper loss in the electromagnet coil can in this way be minimized by allowing electrical current flow in just one of the opposing electromagnets 2, 3.

Examples were utilized to describe the first embodiment of the present invention; however, the present invention is not limited to that embodiment. Various changes and adaptations are possible within the scope of the patent claims as well as within the scope of the technical concepts in the specifications and drawings. For example, the AC current transfer means in the above embodiment for eliminating DC from excitation current utilized a serially connected coil Ls and a capacitor Cs as the resonator means 225 set to resonate at the same frequency as the carrier frequency. However, the resonator means need not utilize such a passive filter and may utilize an active filter instead. Moreover, an electronic volume may be utilized for lowering the impedance in the vicinity of the carrier frequency.

Figure 10:
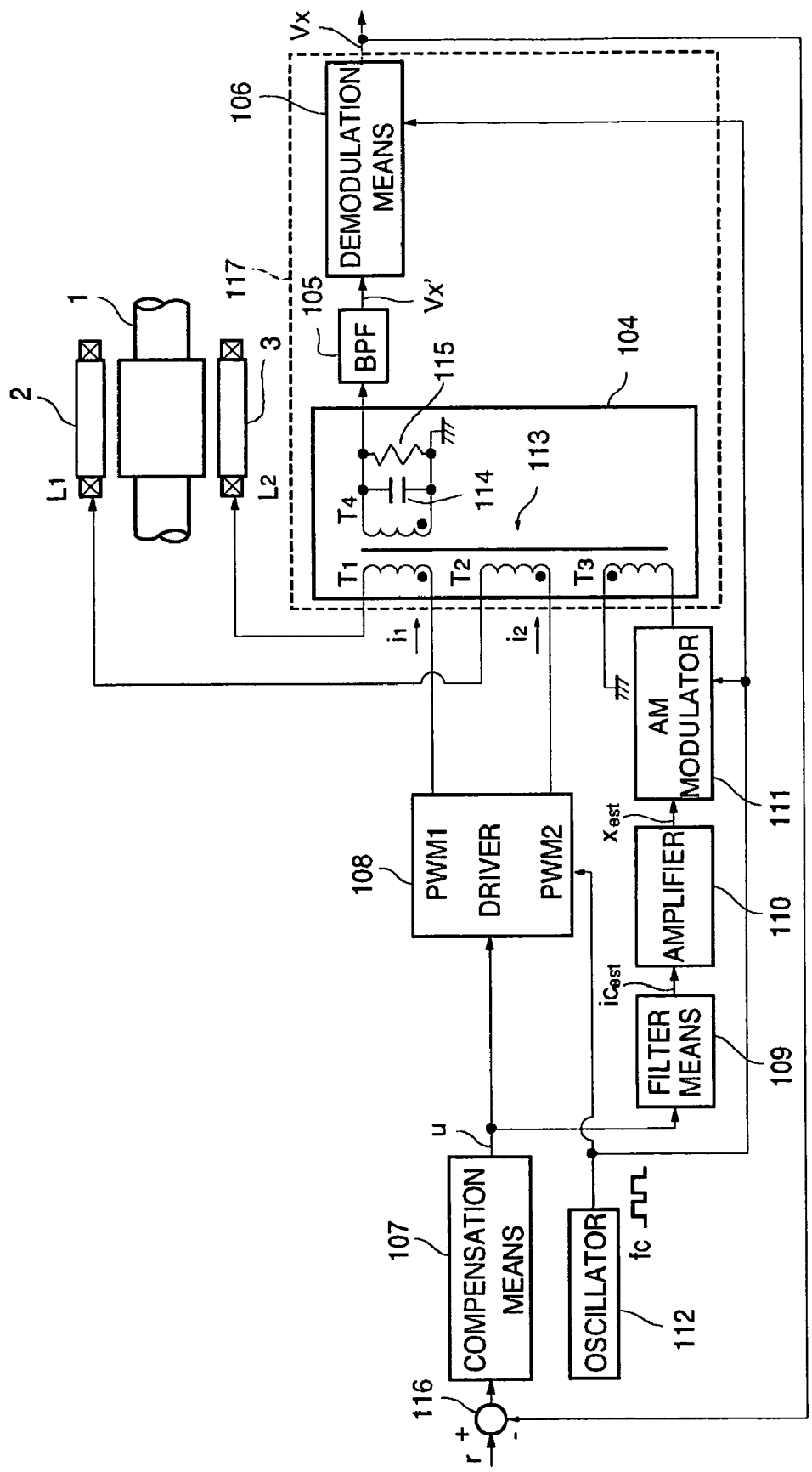
FIG. 10 is a diagram showing an example of the configuration of the magnetic bearing device of the second embodiment of the present invention.
Figure 11:
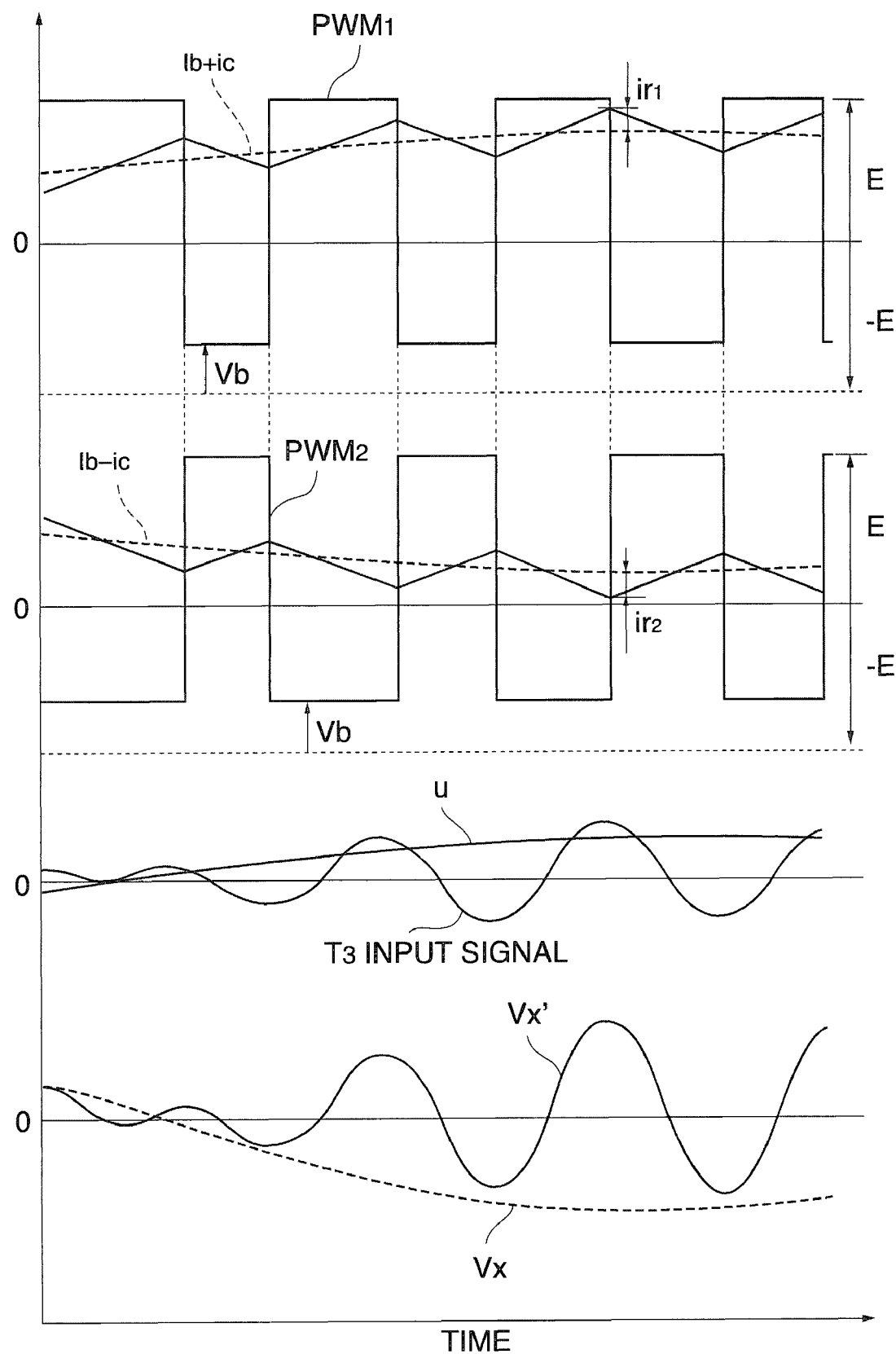
FIG. 11 is a drawing showing the signal waveforms from each unit of the magnetic bearing device of the present invention.
Figure 12:
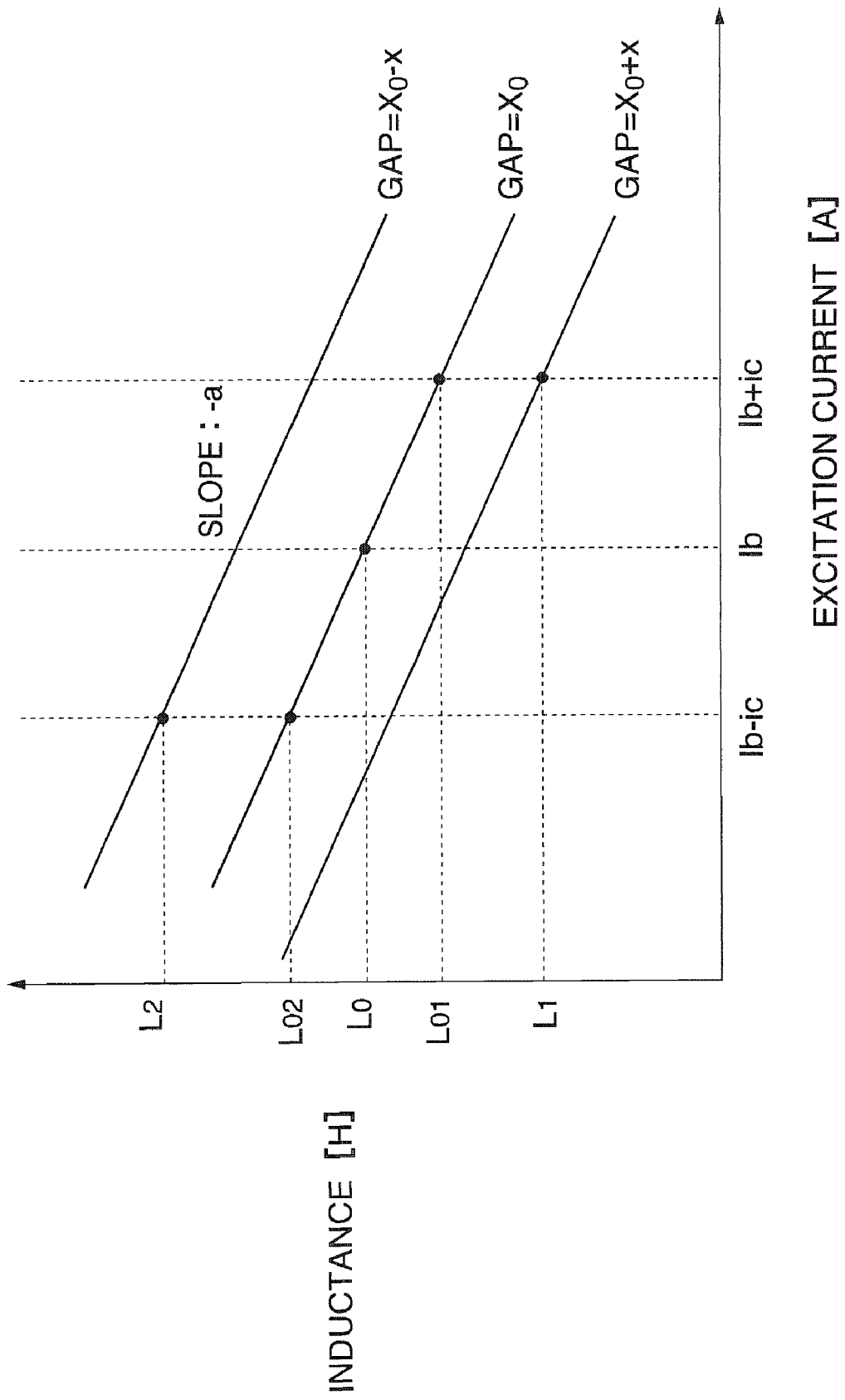
FIG. 12 is a drawing showing the relation of the excitation current to the inductance of the electromagnet of this magnetic bearing device.
Figure 17:
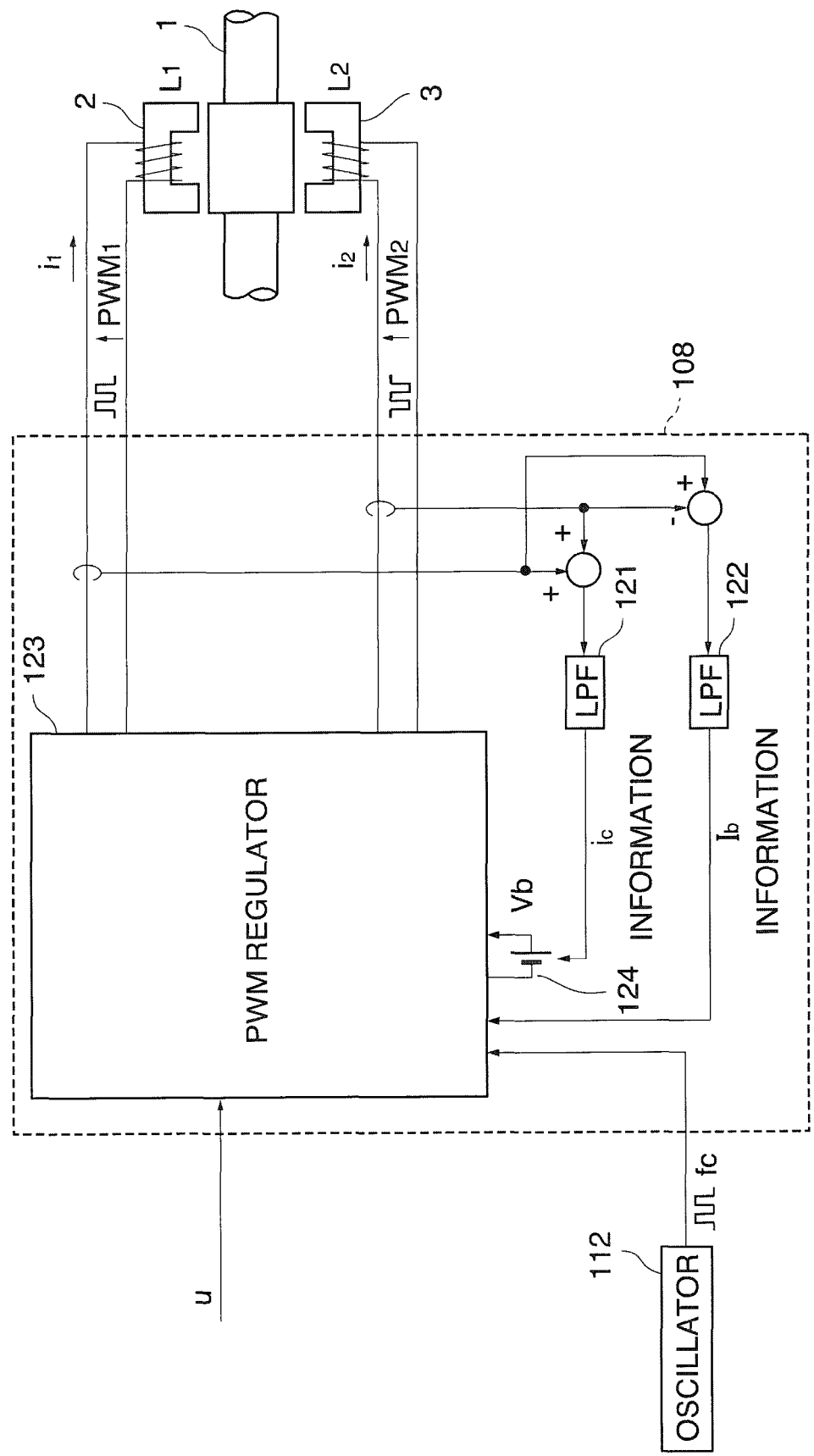
FIG. 17 is a block diagram showing the configuration of the driver 108.

The second embodiment of the present invention is described next with reference to FIG. 10 through FIG. 12 and FIG. 17. FIG. 10 is a block diagram showing an example of the magnetic bearing device of this embodiment of the invention. The reference numeral 1 denotes the rotor. The rotor 1 or in other words a rotating piece made up of a magnetic piece, is interposed between a pair of electromagnets 2, 3 on opposite sides to support the rotor 1 in a non-contact, levitating state. These electromagnets 2, 3 support the rotor 1 in one degree of freedom. Usually multiple pairs of magnets are preferably utilized to support the rotor 1 in a levitating state in 5 degrees of freedom in directions other than rotor axial rotation direction. Here, however for purposes of simplicity only one degree of freedom is described the same as in the first embodiment. The motor for rotating the rotor 1 is also omitted and only the magnetic bearing is described. FIG. 11 is a drawing showing the waveforms for signals from each section of this magnetic bearing device. FIG. 12 is a drawing showing the relation between the excitation current and the inductance of the electromagnets 2, 3. FIG. 17 shows an example of the structure of the driver 108 in FIG. 10. In this second embodiment, unlike the first embodiment, resistance values such as for the electromagnet and cable are considered.

In FIG. 17, the driver 108 is a PWM type driver for supplying an excitation current to the electromagnets 2, 3. This driver 108 supplies the excitation currents $i_1$, $i_2$ to the electromagnets 2, 3 by applying PWM voltages $PWM_1$, $PWM_2$ made up of pulse signals at frequency fc generated by the oscillator 112 as the carrier frequency.

The driver 108 includes a PWM power supply for generating PWM drive voltages E not shown in the drawing, and a bias power supply 124 for generating a bias voltage Vb. The bias voltage Vb is utilized to supply a direct current (DC) bias current Ib to the electromagnets 2, 3. This bias current Ib makes the relation between the excitations current $i_1$, $i_2$ supplied to electromagnets 2, 3 and the magnetic force applied to the rotor 1 linear. Here, setting the DC resistance value of the electromagnets 2, 3 and the cable as R, allows expressing the bias current Ib as shown in formula (8).

$$Ib = Vb/(2R) \tag{8}$$

The driver 108, including PWM regulator 123, supplies a control current i c to the electromagnets 2, 3 superposed by a bias current Ib in the form (Ib+i c, Ib−i c), by controlling the duty ratio of the PWM voltages based on the control signal u from the compensation means 107. The PWM voltages $PWM_1$ and $PWM_2$ applied to the electromagnets 2, 3 at this time are controlled to mutually reciprocate the duty ratios so that if a control current Ib+ic flows in electromagnet 2, then a control current Ib−ic flows in the electromagnet 3.

The ripple currents $ir_1$, $ir_2$ are superposed onto the excitation current supplied to the electromagnets 2, 3 just as described for the first embodiment. These ripple currents $ir_1$, $ir_2$ are generated by the PWM voltages $PWM_1$ and $PWM_2$ and vary according to the impedance of the electromagnets 2, 3. The fundamental frequency of this PWM voltage is sufficiently high since it is a carrier frequency fc, and if taking just the ripple current into account, then impedance of the electromagnets 2, 3 can be regarded as just the inductance component. Therefore, if the PWM voltage is a fixed voltage, then the amplitude of the ripple currents $ir_1$, $ir_2$ is dependent only on the inductance $L_1$, $L_2$ of the electromagnets 2, 3. The duty ratios of the PWM voltages $PWM_1$ and $PWM_2$ are also controlled to mutually reciprocate each other to generate an amplitude that makes the ripple currents $ir_1$, $ir_2$ rise and fall in reciprocal directions. The excitation currents $i_1$, $i_2$ supplied to the electromagnets 2, 3 therefore are derived as shown in formula (9).

$$i_1 = Ib + ic + ir_1$$

$$i_2 = Ib - ic - ir_2 \tag{9}$$

So that formula (10) can be derived from formula (9) as follows.

$$i_1 + i_2 = 2Ib + (ir_1 - ir_2) \tag{10}$$

In formula (10), $ir_1 - ir_2$ is the ripple current component, and its frequency component is mainly the carrier frequency fc. This $ir_1 - ir_2$ therefore is the high frequency component. Removing $ir_1 - ir_2$ by using a low-pass filter allows obtaining formula (11).

$$i_1 + i_2 = 2Ib \tag{11}$$

The information of bias current Ib can therefore be obtained from formula (11).

When the resistance R of the electromagnets 2, 3 and the cables etc. varies due to the temperature and cable length, then the bias current Ib varies as can be seen from formula (8). The driver 108 then detects the excitation currents $i_1$, $i_2$ using the formula (11), and after summing their respective signals, feeds back to the PWM regulator 123 the signal obtained by allowing it to pass through a low-pass filter, so that the bias voltage power source 124 is controlled to maintain the bias current Ib at a specified value.

FIG. 11 is a drawing showing the signal at each portion when the control signal u varies to time as shown. The driver 108 outputs PWM voltages $PWM_1$, and $PWM_2$ and applies them to the electromagnets 2 and 3 respectively. Voltages $PWM_1$, and $PWM_2$ are mutually of reverse waveforms, assuming that the PWM driving voltage is E and the bias voltage is Vb, they are E when the driver is ON and −E+Vb when the driver is OFF. That is, The average voltages applied to the electromagnets 2 and 3 are toward plus side depending on the bias voltage and the control of the voltage Vb can let a desired bias current Ib always flow in the electromagnets 2 and 3. Further, since voltages $PWM_1$, and $PWM_2$ are mutually of reverse waveforms, if the driver 108 controls the duty ratio of the PWM signal based on the control signal u to let the current Ib+ic flow in the electromagnet 2, the current Ib−ic flows in the electromagnet 3. That is, the driver 108 controls the bias current Ib with controlling the bias voltage Vb, and independently controls the control current ic with controlling the duty ratio of the PWM voltage respectively. Further, the ripple currents $ir_1$ and $ir_2$ including the displacement information are respectively superposed on the currents flowing in the electromagnets 2 and 3 depending on the PWM voltage.

Formula (12) can be established from formula (9) as follows.

$$i_1 - i_2 = 2ic + (ir_1 + ir_2) \tag{12}$$

In formula (12), $ir_1 + ir_2$ is the ripple current component and removing it by a low-pass filter or other method yields formula (13).

$$i_1 - i_2 = 2ic \tag{13}$$

The control current ic information can be obtained from formula (13). The driver 108 detects the excitation currents $i_1$, $i_2$ using the formula (13) and after subtraction feeds back a signal obtained by allowing it to pass through a low-pass filter 122 to the PWM regulator to control the duty ratio of the PWM voltage so that the control current ic corresponding to the control signal u from the compensation means 107 is supplied to the electromagnets 2, 3, to induce excitation.

In formula (10), 2Ib denotes the bias current component of the direct current. Removing the direct current component yields the formula (14).

$$i_1 + i_2 = ir_1 - ir_2 \tag{14}$$

In formula (14), the $ir_1 - ir_2$ varies according to the inductances $L_1$, $L_2$ of the electromagnets 2, 3. This $ir_1 - ir_2$ is the ripple current component containing displacement information of the rotor 1. This $ir_1 - ir_2$ is expressed in formula (15).

$$ir_1 - ir_2 = k\{(1/L_1) - (1/L_2)\} \tag{15}$$

The k in formula (15) denotes a constant determined by the carrier frequency fc and the PWM drive voltage E.

Here, when the rotor 1 is in the center between the electromagnet 2 and the electromagnet 3, then the gap between the electromagnet 2 and electromagnet 3 and the rotor 1 is set as $X_0$, and the inductance as $L_0$. The approximate formula (16) can then be established when the electromagnets 2, 3 excitation current is a fixed bias current Ib, and rotor 1 was displaced by a tiny amount x towards the electromagnet 3.

$$(1/L_1) - (1/L_2) = 2x/(L_0 \cdot X_0) \tag{16}$$

The excitation current for electromagnets 2, 3 is actually a control current ic superposed onto the bias current Ib and it varies. The inductances of the electromagnets 2, 3 vary according to the excitation current as well as the displacement of the rotor 1. This inductance variation occurs because the magnetic properties of the electromagnet core vary due to the excitation current. In other words, it is because the core inductance of the electromagnet varies. If the variation width of the excitation current Ib±ic of electromagnets 2, 3 is not very large, and the rotor 1 displacement amount x is of tiny quantity, then the inductance characteristics in this range of conditions will have a slope of "−a", due to the control current ic. This state is shown in FIG. 12.

Therefore even if the rotor 1 is fixed at a gap $X_0$, the inductances will be $L_{01}$, $L_{02}$ if the electromagnet 2, 3 excitation currents are Ib+ic, Ib−ic, and cause respectively different values to occur. This inductance variation is what makes the ripple current component cause displacement detection errors. By taking this inductance variation due to control current ic into account, the formula (16) can be rewritten as follows as formula (16').

$$(1/L_1) - (1/L_2) = (2x/(L_0 \cdot X_0)) + (2a/L_0^2) \cdot ic \tag{16'}$$

The formula (17) can also be obtained from formulas (14), (15), (16')

$$i_1 + i_2 = (2k/(L_0 \cdot X_0)) \cdot x + (2ak/L_0^2) \cdot ic \tag{17}$$

Here, "a" is found in advance by calculation or by actual measurement.

In the present invention, the ripple detection means 104 including a transformer 113 is utilized to obtain displacement information from the excitation currents $i_1$, $i_2$ in the electromagnets 2, 3 subjected to excitation, by using formula (17). The transformer 113 in this ripple detection means 104 has windings $T_1$, $T_2$ so as to sum the excitation currents $i_1$, $i_2$ by utilizing electromagnetic induction. The inductance of windings $T_1$, $T_2$ is set to be considerably smaller than the inductance of the electromagnets 2, 3. A winding $T_4$ on this transformer 113 is wound so as to increase the sum of the excitation currents $i_1$, $i_2$ obtained from $T_1$, $T_2$ by a specified scaling factor b and output it.

The direct current component is at this time removed by the winding $T_4$, and the displacement information signal contained in the ripple current component is extracted. The bandpass filter effect is obtained to extract the ripple current component only at the specified frequency band by connecting a capacitor 114 and a resistance 115 in parallel across both terminals of the winding $T_4$. The specified frequency band for extraction is set in the vicinity of the carrier frequency fc which is the main frequency of the ripple current component. The ripple detection means 104 acquires the displacement detection signal from the excitation currents $i_1$, $i_2$, and outputs it as an AM modulation signal of the carrier frequency fc.

The signal output from the ripple detection means 104 is input to the band-pass filter (BPF) 105, surplus noise is removed, and the displacement modulation signal Vx' is acquired. This displacement modulation signal Vx' is expressed by formula (18).

$$Vx' = b(i_1 + i_2) \tag{18}$$

The formula (19) is obtained from the formula (17) and (18).

$$Vx' = Ks \cdot x + a \cdot ic \tag{19}$$

Here, $Ks = 2bk/(L_0 \cdot X_0)$ and $a = 2abk/L_0^2$ are constants. The excitation currents $i_1$, $i_2$ are detected according to this formula (19). Here it can be seen that the displacement differential component $a \cdot ic$ that varies due to displacement information component $Ks \cdot x$ and the control current ic, is contained in the displacement modulation signal Vx' which is acquired via the bandpass filter 105 and ripple detection means 104.

If Gdr is set as the transfer characteristics from the control signal u to be output of the compensation means 107 and to be input to the driver 108 to the control current ic, then a formula (20) can be expressed from formula (19).

$$Vx' = Ks \cdot x + a \cdot Gdr \cdot u \tag{20}$$

The Gdr transfer characteristic is generally not of a very high order, and is the low-order low-pass filter characteristic. In the present invention, in order to remove the displacement error signal $a \cdot Gdr \cdot u$ of formula (20), an estimated control current $ic_{est}$ is acquired by allowing the control signal u to pass through a filter means 109 containing a low pass filter with characteristics equivalent to the transfer characteristic Gdr. This estimated control current $ic_{est}$ is increased a times by an amplifier 110 whose scale factor is equal to the constant a, and the estimated displacement error signal $x_{est}$ is obtained.

The AM modulator 111 amplitude-modulates the estimated displacement error signal $x_{est}$ based on the carrier frequency fc, and inputs the resulting signal into the winding $T_3$ of transformer 113 of the ripple detection means 104. The winding $T_3$ of transformer 113 is wound so as the current signal passing the winding T3 to be subtracted from the summed signals of excitation currents $i_1$, $i_2$ acquired from the windings $T_1$, $T_2$. The winding $T_4$ can in this way acquire a displacement information signal whose displacement error signal component was accurately removed. The displacement modulation signal Vx' acquired via the band-pass filter 105 can therefore be rewritten from formula (20) to (20') as follows.

$$Vx' \approx Ks \cdot x \quad (20')$$

The displacement modulation signal Vx' is demodulated by the demodulation means 106 which is synchronized with the carrier frequency fc, and the displacement signal Vx amplified with a specified gain (scale factor c) is obtained. The formula (20') in this way becomes the formula (21).

$$Vx' \approx Ks \cdot c \cdot x \quad (21)$$

The two sets of curves at the bottom half of FIG. 11 are the control signal u, the input signal having a wave form of the error differential signal to be input to T3, the signal which the error is removed from and the demodulated wave form Vx.

The displacement detection means 117 including the ripple detection means 104, the band-pass filter 105, and the demodulation means 106 is in this way able to output the displacement signal Vx. The displacement signal Vx is therefore output as a signal where the displacement x is amplified with gain of Ks·c as described in the formula (21). This output signal is then fed back and compared with the target levitating position signal r in the comparator 116, so that by then acquiring the signal u compensated in the compensation means 107, the rotor 1 can be stably supported at a specified position in a non-contact levitating state.

The second embodiment of the present invention was described, however, the present invention is not limited to the above embodiments, and various changes and adaptations are possible within the scope of the patent claims as well as the within the scope of the technical concepts in the specifications and drawings.

The invention claimed is:

1. A magnetic bearing device for rotatably supporting a magnetic piece in a levitating state at a predetermined position comprising:
   an electromagnet for supporting the magnetic piece in a levitating state by magnetic force;
   displacement detection means for detecting a displacement of the magnetic piece based on impedance change in the electromagnet; and
   a driver for applying an excitation current to the electromagnet so as to support the magnetic piece in a levitating state at a predetermined position based on a detection signal from the displacement detection means;
   wherein the magnetic piece is interposed between a plurality of electromagnets installed opposite each other,
   the driver is a pulse width modulation driver to control an excitation current of the electromagnet by modulating a pulse width of a pulse voltage driven at a predetermined carrier frequency, and includes an alternating current transfer means for setting a direct current component of the excitation current to zero, and when excitation current flows to one of the electromagnets installed facing each other, then the alternating current transfer means sets a direct current component of the excitation current of the other electromagnet to zero.

2. A magnetic bearing device for rotatably supporting a magnetic piece in a levitating state at a predetermined position comprising:
   an electromagnet for supporting the magnetic piece in a levitating state by magnetic force;
   displacement detection means for detecting a displacement of the magnetic piece based on impedance change in the electromagnet;
   compensation means for compensating so as to stably support the magnetic piece in a levitating state based on a detection signal from the displacement detection means; and
   a driver for applying an excitation current to the electromagnet based on an output signal from the compensation means;
   wherein the magnetic piece is interposed between a plurality of electromagnets installed opposite each other,
   the driver is a pulse width modulation type driver to control an excitation current of the electromagnet by modulating a pulse width of a pulse voltage driven at a predetermined carrier frequency, and includes an alternating current transfer means for setting a direct current component of the excitation current to zero, and when excitation current flows to one of the electromagnets installed facing each other, then the alternating current transfer means sets a direct current component of the excitation current of the other electromagnet to zero.

3. The magnetic bearing device according to claim 2, wherein the compensation means is means to compensate a control loop phase.

4. A magnetic bearing method for rotatably supporting a magnetic piece in a levitating state at a predetermined position with a plurality of electromagnets installed opposite each other interposing the magnetic piece therebetween comprising the steps of:
   supporting the magnetic piece in a levitating state by magnetic force of the electromagnet;
   detecting a displacement of the magnetic piece based on impedance change in the electromagnet; and
   driving for applying an excitation current to the electromagnet so as to support the magnetic piece in a levitating state at a predetermined position based on a detection signal obtained by the detecting step;
   wherein the driving step has a pulse width modulating step to control an excitation current of the electromagnet by modulating a pulse width of a pulse voltage driven at a predetermined carrier frequency, and includes an alternating current transferring step for setting a direct current component of the excitation current to zero, and when excitation current flows to one of the electromagnets installed facing each other, the alternating current transferring step sets a direct current component of the excitation current of the other electromagnet to zero.

5. A magnetic bearing method for rotatably supporting a magnetic piece in a levitating state at a predetermined position with a plurality of electromagnets installed opposite each other interposing the magnetic piece therebetween comprising the steps of:
   supporting the magnetic piece in a levitating state by magnetic force of the electromagnet;
   detecting a displacement of the magnetic piece based on impedance change in the electromagnet; and compensating so as to stably support the magnetic piece in a levitating state based on a detection signal obtained by the detecting step; and driving for applying an excitation current to the electromagnet so as to support the magnetic piece in a levitating state at a predetermined position based on a result from the compensating step;

wherein the driving step has a pulse width modulating step to control an excitation current of the electromagnet by modulating a pulse width of a pulse voltage driven at a predetermined carrier frequency, and includes an alternating current transferring step for setting a direct current component of the excitation current to zero, and when excitation current flows to one of the electromagnets installed facing each other, the alternating current transferring step sets a direct current component of the excitation current of the other electromagnet to zero.

6. The magnetic bearing method according to claim 5, wherein the compensating step is a step of compensating a control loop phase.

7. The magnetic bearing device according to claim 1, wherein the alternating current transfer means is resonator means with a serially connected coil and capacitor for electrically resonating at the same frequency as the carrier frequency.

8. The magnetic bearing device according to claim 2, wherein the alternating current transfer means is resonator means with a serially connected coil and capacitor for electrically resonating at the same frequency as the carrier frequency.

9. The magnetic bearing device according to claim 1, comprising:

means for detecting respective excitation currents flowing in the electromagnets installed opposite each other sandwiching the magnetic piece and subtracting a deference of signals of the detected currents after the deference signal passing through filter means of predetermined frequency characteristics from the output of the displacement detecting means, wherein the predetermined frequency characteristics are equivalent to the frequency characteristics of the displacement detection means.

10. The magnetic bearing device according to claim 2, comprising:

means for detecting respective excitation currents flowing in the electromagnets installed opposite each other sandwiching the magnetic piece and subtracting a deference of signals of the detected currents after the deference signal passing through filter means of predetermined frequency characteristics from the output of the displacement detecting means, wherein the predetermined frequency characteristics are equivalent to the frequency characteristics of the displacement detection means.

11. The magnetic bearing device according to claim 1, wherein a signal contained in a signal detected by the displacement detection means other than the displacement information of the magnetic piece is removed by amplitude-modulated (AM) modulating the carrier frequency signal with an output signal of a filter means of characteristics equivalent to the transfer characteristics from getting current flow to the driver to current flowing in the electromagnets and by subtracting a signal obtained by the AM modulation from a signal obtained from comparing a value of a ripple current occurring after applying a pulse voltage to an electromagnets in which excitation current is flowing, among an electromagnet pair installed facing each other, with a value of a ripple current occurring after applying a voltage via the alternating current transfer means to the other magnet whose direct current component within the excitation current is set to zero.

12. The magnetic bearing device according to claim 2, wherein a signal contained in a signal detected by the displacement detection means other than the displacement information of the magnetic piece is removed by AM modulating the carrier frequency signal with an output signal of a filter means of characteristics equivalent to the transfer characteristics from getting current flow to the driver to current flowing in the electromagnets and by subtracting a signal obtained by the AM modulation from a signal obtained from comparing a value of a ripple current occurring after applying a pulse voltage to an electromagnets in which excitation current is flowing, among an electromagnet pair installed facing each other, with a value of a ripple current occurring after applying a voltage via the alternating current transfer means to the other magnet whose direct current component within the excitation current is set to zero.

13. The magnetic bearing device according to claim 1, further comprising a linearization means for changing the non-linear relation between the magnetic force of the electromagnet exerted on the magnetic piece and the excitation current into a linear relation.

14. The magnetic bearing device according to claim 2, further comprising a linearization means for changing the non-linear relation between the magnetic force of the electromagnet exerted on the magnetic piece and the excitation current into a linear relation.

15. The magnetic bearing device according to claim 13, wherein the compensation means, or the linearization means, or the compensation means and the linearization means acquire an output by digital processing.

16. The magnetic bearing device according to claim 14, wherein the compensation means, or the linearization means, or the compensation means and the linearization means acquire an output by digital processing.

17. A magnetic bearing device for rotatably supporting a magnetic piece in a levitating state at a predetermined position comprising:

an electromagnet for supporting the magnetic piece in a levitating state by magnetic force;

displacement detection circuit for detecting a displacement of the magnetic piece based on impedance change in the electromagnet; and a driver for applying an excitation current to the electromagnet so as to support the magnetic piece in a levitating state at a predetermined position based on a detection signal from the displacement detection circuit;

wherein the magnetic piece is interposed between a plurality of electromagnets installed opposite each other, the driver is a pulse width modulation type driver to control an excitation current of the electromagnet by modulating a pulse width of a pulse voltage driven at a predetermined carrier frequency, and includes an alternating current transfer circuit for setting a direct current component of the excitation current to zero, and when excitation current flows to one of the electromagnets installed facing each other, then the alternating current transfer circuit sets a direct current component of the excitation current of the other electromagnet to zero.

18. A magnetic bearing device for rotatably supporting a magnetic piece in a levitating state at a predetermined position comprising:

an electromagnet for supporting the magnetic piece in a levitating state by magnetic force;

displacement detection circuit for detecting a displacement of the magnetic piece based on impedance change in the electromagnet;

compensator for compensating so as to stably support the magnetic piece in a levitating state based on a detection signal from the displacement detection circuit; and a driver for applying an excitation current to the electromagnet based on an output signal from the compensator;

wherein the magnetic piece is interposed between a plurality of electromagnets installed opposite each other, the driver is a pulse width modulation type driver to control an excitation current of the electromagnet by modulating a pulse width of a pulse voltage driven at a predetermined carrier frequency, and includes an alternating current transfer circuit for setting a direct current component of the excitation current to zero, and when excitation current flows to one of the electromagnets installed facing each other, then the alternating current transfer circuit sets a direct current component of the excitation current of the other electromagnet to zero.

19. The magnetic bearing device according to claim 18, wherein the compensator is a circuit to compensate a control loop phase.

20. The magnetic bearing device according to claim 17, wherein the alternating current transfer circuit is resonator circuit with a serially connected coil and capacitor for electrically resonating at the same frequency as the carrier frequency.

21. The magnetic bearing device according to claim 18, wherein the alternating current transfer circuit is resonator circuit with a serially connected coil and capacitor for electrically resonating at the same frequency as the carrier frequency.

22. The magnetic bearing device according to claim 17, comprising a subtractor which detects respective excitation currents flowing in the electromagnets installed opposite each other sandwiching the magnetic piece and subtracts a deference of signals of the detected currents after the deference signal passing through a filter of predetermined characteristics from the output of the displacement detection circuit, wherein the predetermined characteristics are equivalent to the frequency characteristics of the displacement detection circuit.

23. The magnetic bearing device according to claim 18, comprising a subtractor which detects respective excitation currents flowing in the electromagnets installed opposite each other sandwiching the magnetic piece and subtracts a deference of signals of the detected currents after the deference signal passing through a filter of predetermined characteristics from the output of the displacement detection circuit, wherein the predetermined characteristics are equivalent to the frequency characteristics of the displacement detection circuit.

24. The magnetic bearing device according to claim 17, wherein signals contained in signals detected by the displacement detection circuit other than the displacement information of the magnetic piece are removed by AM modulating the carrier frequency signal with an output signal of a filter of characteristics equivalent to the transfer characteristics from getting current flow to the driver to current flowing in the electromagnets and by subtracting a signal obtained by the AM modulation from a signal obtained from comparing a value of a ripple current occurring after applying a pulse voltage to an electromagnets in which excitation current is flowing, among an electromagnet pair installed facing each other, with a value of a ripple current occurring after applying a voltage via the alternating current transfer circuit to the other magnet whose direct current component within the excitation current is set to zero.

25. The magnetic bearing device according to claim 18, wherein signals contained in signals detected by the displacement detection circuit other than the displacement information of the magnetic piece are removed by AM modulating the carrier frequency signal with an output signal of a filter of characteristics equivalent to the transfer characteristics from getting current flow to the driver to current flowing in the electromagnets and by subtracting a signal obtained by the AM modulation from a signal obtained from comparing a value of a ripple current occurring after applying a pulse voltage to an electromagnets in which excitation current is flowing, among an electromagnet pair installed facing each other, with a value of a ripple current occurring after applying a voltage via the alternating current transfer circuit to the other magnet whose direct current component within the excitation current is set to zero.

26. The magnetic bearing device according to claim 17, further comprising a linearization circuit for changing the non-linear relation between the magnetic force of the electromagnet exerted on the magnetic piece and the excitation current into a linear relation.

27. The magnetic bearing device according to claim 18, further comprising a linearization circuit for changing the non-linear relation between the magnetic force of the electromagnet exerted on the magnetic piece and the excitation current into a linear relation.

28. The magnetic bearing device according to claim 26, wherein the compensator, or the linearization circuit, or the compensator and the linearization circuit acquire an output by digital processing.

29. The magnetic bearing device according to claim 27, wherein the compensator, or the linearization circuit, or the compensator and the linearization circuit acquire an output by digital processing.

* * * * *